US010005152B2

(12) United States Patent
Hosseini

(10) Patent No.: US 10,005,152 B2
(45) Date of Patent: Jun. 26, 2018

(54) METHOD AND APPARATUS FOR SPIRAL CUTTING A GLASS TUBE USING FILAMENTATION BY BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES LLC, Plymouth, MI (US)

( * ) Notice: Subject to any disclaimer, the term of this patent is extended or adjusted under 35 U.S.C. 154(b) by 720 days.

(21) Appl. No.: 14/547,729

(22) Filed: Nov. 19, 2014

(65) Prior Publication Data

US 2015/0140241 A1 May 21, 2015

Related U.S. Application Data

(60) Provisional application No. 61/906,321, filed on Nov. 19, 2013.

(51) Int. Cl.
*C03B 33/095* (2006.01)
*B23K 26/00* (2014.01)
(Continued)

(52) U.S. Cl.
CPC ...... *B23K 26/0057* (2013.01); *B23K 26/0617* (2013.01); *B23K 26/0622* (2015.10);
(Continued)

(58) Field of Classification Search
CPC ............ C03B 33/0955; C03B 33/0855; C03C 21/002–21/003
See application file for complete search history.

(56) References Cited

U.S. PATENT DOCUMENTS 5,107,510 A 4/1992 Seguin et al.
5,567,336 A 10/1996 Tatah
(Continued)

FOREIGN PATENT DOCUMENTS

CA 2332154 9/2009
CA 2907757 9/2014
(Continued)

OTHER PUBLICATIONS

European Patent Office, Extended European Search Report, dated Mar. 18, 2015, pp. 1-6, Application No. 14179302.4, Applicant: Rofin-Sinar Technologies, Inc.
(Continued)

*Primary Examiner* — Jason L Lazorcik
(74) *Attorney, Agent, or Firm* — Woodling, Krost and Rust

(57) ABSTRACT

A method of producing a spiral cut transparent tube using laser machining includes using an ultrafast laser beam comprising a burst of laser pulses and focusing the laser beam on the transparent tube to enable relative movement between the laser beam and the transparent tube by moving the laser beam, the glass tube or both the laser beam and the glass tube. A beam waist is formed external to the surface of the transparent tube wherein the laser pulses and sufficient energy density is maintained within the transparent tube to form a continuous laser filament therethrough without causing optical breakdown. The method and delivery system makes a spiral cut in the transparent tube.

17 Claims, 24 Drawing Sheets

(51) Int. Cl.
  *C03B 33/02* (2006.01)
  *C03B 33/06* (2006.01)
  *B23K 26/06* (2014.01)
  *B23K 26/402* (2014.01)
  *B23K 26/0622* (2014.01)
  *B23K 26/382* (2014.01)
  *B23K 103/00* (2006.01)

(52) U.S. Cl.
  CPC ........ *B23K 26/0665* (2013.01); *B23K 26/382* (2015.10); *B23K 26/402* (2013.01); *C03B 33/0222* (2013.01); *C03B 33/06* (2013.01); *B23K 2203/50* (2015.10); *B23K 2203/52* (2015.10); *Y10T 428/131* (2015.01); *Y10T 428/15* (2015.01); *Y10T 428/21* (2015.01); *Y10T 428/218* (2015.01)

(56) References Cited

U.S. PATENT DOCUMENTS

| | | | |
|---|---|---|---|
| 5,609,284 A | 3/1997 | Kondratenko | |
| 5,779,753 A * | 7/1998 | Vetter | B23K 26/0081 65/105 |
| 6,055,829 A * | 5/2000 | Witzmann | C03B 33/0955 216/65 |
| 6,084,897 A | 7/2000 | Wakabayashi et al. | |
| 6,204,472 B1 * | 3/2001 | Muzzi | B23K 26/0823 219/121.67 |
| 6,407,360 B1 | 6/2002 | Choo et al. | |
| 6,438,996 B1 * | 8/2002 | Cuvelier | C03B 33/0955 219/121.67 |
| 6,489,589 B1 * | 12/2002 | Alexander | A61C 1/0046 219/121.69 |
| 6,552,301 B2 | 4/2003 | Herman et al. | |
| 7,033,519 B2 | 4/2006 | Taylor et al. | |
| 7,211,184 B2 | 5/2007 | Webster et | |
| 7,218,448 B1 | 5/2007 | Cathey, Jr. et al. | |
| 7,303,977 B2 | 12/2007 | Voronov et al. | |
| 7,605,344 B2 | 10/2009 | Fukumitsu | |
| 7,626,138 B2 | 12/2009 | Bovatsek et al. | |
| 8,097,830 B2 | 1/2012 | Woeste et al. | |
| 8,624,157 B2 | 1/2014 | Albelo et al. | |
| 8,835,802 B2 | 9/2014 | Baer | |
| 8,842,358 B2 | 9/2014 | Bareman et al. | |
| 8,852,698 B2 | 10/2014 | Fukumitsu | |
| 9,102,007 B2 | 8/2015 | Hosseini | |
| 9,102,011 B2 | 8/2015 | Hosseini | |
| 2002/0125232 A1 | 9/2002 | Choo et al. | |
| 2002/0195433 A1 | 12/2002 | Troitski | |
| 2003/0006221 A1 | 1/2003 | Hong et al. | |
| 2003/0072890 A1 | 4/2003 | Miyazawa | |
| 2004/0016729 A1 * | 1/2004 | Cuvelier | C03B 33/0955 219/121.72 |
| 2004/0017428 A1 | 1/2004 | Cronin et al. | |
| 2004/0248503 A1 | 12/2004 | Benderly | |
| 2005/0006361 A1 | 1/2005 | Kobayashi et al. | |
| 2005/0186760 A1 | 8/2005 | Hashimura et al. | |
| 2005/0269301 A1 | 12/2005 | Burrowes et al. | |
| 2005/0272223 A1 | 12/2005 | Fujii et al. | |
| 2006/0099810 A1 | 5/2006 | Voronov et al. | |
| 2006/0108339 A1 | 5/2006 | Nishiwaki et al. | |
| 2006/0207976 A1 | 9/2006 | Bovatsek et al. | |
| 2007/0051706 A1 | 3/2007 | Bovatsek et al. | |
| 2007/0298529 A1 | 12/2007 | Maeda et al. | |
| 2009/0151996 A1 | 6/2009 | Mishima et al. | |
| 2009/0294422 A1 | 12/2009 | Lubatschowski et al. | |
| 2010/0025387 A1 * | 2/2010 | Arai | B28D 5/00 219/121.69 |
| 2010/0084384 A1 | 4/2010 | Bovatsek et al. | |
| 2010/0086741 A1 * | 4/2010 | Bovatsek | B23K 26/0617 428/156 |
| 2010/0107694 A1 * | 5/2010 | Dannoux | C03B 23/045 65/60.1 |
| 2010/0279067 A1 | 11/2010 | Sabia et al. | |
| 2011/0259631 A1 | 10/2011 | Rumsby | |
| 2012/0047951 A1 * | 3/2012 | Dannoux | C03B 17/06 65/25.3 |
| 2012/0234807 A1 * | 9/2012 | Sercel | B23K 26/0608 219/121.69 |
| 2012/0235969 A1 | 9/2012 | Burns et al. | |
| 2013/0068736 A1 * | 3/2013 | Mielke | B23K 26/38 219/121.71 |
| 2013/0101596 A1 * | 4/2013 | DeMartino | A61J 1/00 424/142.1 |
| 2013/0126573 A1 | 5/2013 | Hosseini et al. | |
| 2013/0183837 A1 | 7/2013 | Arai et al. | |
| 2013/0186143 A1 * | 7/2013 | Ziegler | C03B 17/04 65/86 |
| 2013/0247615 A1 * | 9/2013 | Boek | C03C 15/00 65/29.1 |
| 2013/0293482 A1 | 11/2013 | Burns et al. | |
| 2014/0000747 A1 * | 1/2014 | Lasarov | B05D 1/32 138/108 |
| 2014/0079570 A1 | 3/2014 | Schweitzer et al. | |
| 2014/0199519 A1 | 7/2014 | Schillinger et al. | |
| 2014/0213040 A1 | 7/2014 | Morikazu et al. | |
| 2014/0216108 A1 * | 8/2014 | Wiegel | C03B 33/082 65/56 |
| 2014/0248757 A1 | 9/2014 | Morikazu et al. | |
| 2014/0340730 A1 * | 11/2014 | Bergh | B23K 26/38 359/275 |
| 2015/0158120 A1 * | 6/2015 | Courvoisier | B23K 26/0613 264/482 |
| 2015/0165563 A1 * | 6/2015 | Manley | B32B 17/00 428/34 |
| 2015/0166393 A1 * | 6/2015 | Marjanovic | C03B 33/091 428/131 |
| 2015/0166394 A1 | 6/2015 | Marjanovic et al. | |
| 2015/0299018 A1 * | 10/2015 | Bhuyan | B23K 26/0057 65/29.18 |
| 2015/0360991 A1 | 12/2015 | Grundmueller et al. | |
| 2015/0367442 A1 | 12/2015 | Bovatsek et al. | |
| 2016/0002103 A1 * | 1/2016 | Wang | C03C 15/00 428/141 |
| 2016/0009586 A1 * | 1/2016 | Bookbinder | C03B 33/06 65/112 |
| 2016/0031745 A1 | 2/2016 | Ortner et al. | |
| 2016/0059359 A1 | 3/2016 | Krueger et al. | |
| 2016/0060156 A1 | 3/2016 | Krueger et al. | |

FOREIGN PATENT DOCUMENTS

| | | | |
|---|---|---|---|
| CN | 102785031 | 4/2015 | |
| EP | 2781296 | 9/2014 | |
| EP | 2898982 A2 | 12/2014 | |
| EP | 2868421 A1 | 5/2015 | |
| EP | 2754524 | 11/2015 | |
| JP | 2006305803 | 11/2006 | |
| JP | 2009066627 A | 4/2009 | |
| JP | 2010160734 | 7/2010 | |
| JP | 4692717 | 3/2011 | |
| JP | 5089735 | 9/2012 | |
| JP | 5271092 | 5/2013 | |
| KR | 1344368 B1 * | 12/2013 | |
| WO | 2009114375 A2 | 9/2009 | |
| WO | 2010111089 A2 | 9/2010 | |
| WO | 2012006736 | 1/2012 | |
| WO | WO 2012006736 A2 * | 1/2012 | ......... B23K 26/0057 |
| WO | 2012094737 A1 | 7/2012 | |
| WO | WO 2013138802 A1 * | 9/2013 | ......... B23K 26/0057 |
| WO | 2014075995 | 5/2014 | |
| WO | 2014079570 | 5/2014 | |
| WO | 2014111385 | 7/2014 | |
| WO | 2014111794 | 7/2014 | |
| WO | 2014121261 | 8/2014 | |
| WO | 2014134470 | 9/2014 | |
| WO | 2014144322 | 9/2014 | |
| WO | 2014147048 | 9/2014 | |
| WO | 2014161535 | 10/2014 | |
| WO | 2015075059 | 5/2015 | |

(56) References Cited

FOREIGN PATENT DOCUMENTS

| WO | 2015094994 | 6/2015 |
|---|---|---|
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.
Hosseini et al., Measurement of a Filament Length Generated by an Intense Femtosecond Laser Pulse Using Electromagnetic Radiation Detection, Applied Physics B, 2003, pp. 583-586, vol. 76, Quebec, Canada.
Hosseini et al., Multi-Parameter Characterization of the Longitudinal Plasma Profile of a Filament: A Comparative Study, Applied Physics B, 2004, pp. 519-523, vol. 79.
Hosseini et al., Competition of Multiple Filaments During the Propagation of Intense Femtosecond Laser Pulses, The Americal Physical Society, Physical Review A 70, 033802, 2004, pp. 1-12.
Arnold et al., Laser Direct—Write Techniques for Priting of Complex Materials, MRS Bulletin, Jan. 2007, vol. 32 pp. 23-31.
Nagel et al., Laser-Induced Forward Transfer for the Fabrication of Devices, Nanomaterials: Processing and Characterization With Lasers, First Edition, 2012, Published by Wiley-VCH Verlag Gmbh & Co. KGAA, pp. 255-316.
Palla-Papavlu et al., Laser Induced Forward Transfer for Materials Patterning, Romanian Reports in Physics, Aug. 2011, vol. 63, Supplement, pp. 1285-1301.
Pique et al., Digital Microfabrication by Laser Decal Transfer, JLMN—Journal of Laser Micro/Nanoengineering, 2008, vol. 3, No. 3, pp. 163-169.
European Patent Office, European Search Report, dated May 18, 2015, pp. 1-6, Application No. 14193909.0, Applicant: Rofin-Sinar Technologies, Inc.
Gill, Jonathan, Creating an Exotic New Form of Light With Simple Optical Elements, Nov. 2014, pp. 1-21, Waldorf School of Garden City, Garden City, New York, Laser Teaching Center Department of Physics and Astronomy, Stony Brook University, Intel Science Talent Search.
Dowski et al, Extended Depth of Field Through Wave-Front Coding, Applied Optics, Apr. 10, 1995, vol. 34, No. 11, pp. 1859-1866.
Arnison et al., High Resolution Extended Depth of Field Microscopy Using Wavefront Coding, pp. 1-19.
Siviloglou, Georgios A., Accelerating Optical Airy Beams, Dissertation, 2010, pp. 1-166.
Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.
Hosseini, S. Abbas, Method and Apparatus for Laser Processing of Silicon by Filamentation of Burst Ultrafast Laser Pulses, U.S. Appl. No. 14/556,078, filed Nov. 28, 2014, Applicant: Rofin-Sinar Technologies, Inc.
Hosseini, S. Abbas, Method and Apparatus for Material Processing Using Multiple Filamentation of Burst Ultrafast Laser Pulses, U.S. Appl. No. 14/629,327, filed Feb. 23, 2015, Applicant: Rofin-Sinar Technologies, Inc.
Hosseini, S. Abbas, Method and System for Scribing Heat Processed Transparent Materials, U.S. Appl. No. 14/700,228, filed Apr. 30, 2015, Applicant: Rofin-Sinar Technologies, Inc.
Hosseini, S. Abbas, Method and Apparatus for Performing Laser Curved Filamentation Within Transparent Materials, U.S. Appl. No. 14/742,187, filed Jun. 17, 2015, Applicant: Rofin-Sinar Technologies, Inc.
European Patent Office, Extended European Search Report, dated Jul. 29, 2015, pp. 1-8, Application No. 14193908.2, Applicant: Rofin-Sinar Technologies, Inc.
European Patent Office, Extended European Search Report, dated Jul. 14, 2015, pp. 1-14, Application No. 14195892.6, Applicant: Rofin-Sinar Technologies, Inc.
European Patent Office, Extended European Search Report, dated Feb. 26, 2015, pp. 1-7. Application No. 14193911.6, Applicant: Rofin-Sinar Technologies, Inc.
European Patent Office, Extended European Search Report, dated Mar. 11, 2015, pp. 1-6, Application No. 14191146.1, Applicant: Rofin-Sinar Technologies, Inc.
European Patent Office, Partial European Search Report, dated May 18, 2015, pp. 1-6, Application No. 14193909, Applicant: Rofin-Sinar Technologies, Inc.
European Patent Office, Extended European Search Report, dated Sep. 14, 2015, pp. 1-7, Application No. 14179403.2, Applicant: Rofin-Sinar Technologies, Inc.
Strigin et al., Laser Processing of Glass by Picosecond Pulses, Quantum Electronics, 1994, pp. 732-735, vol. 24, No. 8, Kvantovaya Elektronika and Turpion Ltd.
Bhuyan et al., High Aspect Ratio Taper-Free Microchannel Fabrication Using Femtosecond Bessel Beams, Optics Express, Jan. 18, 2010, pp. 566-574, vol. 18, No. 2.
Migliore et al., Advances in Laser Singulation of Silicon, Paper #770, pp. 1-6, Coherent, Inc., Santa Clara, CA, USA; HBL Corporation, Daejeon 305-811 Korea.
Watanabe et al., Filamentation in Ultrafast Laser Material Processing, Book for Springer Series "Progress in Ultrafast Intense Laser Science", pp. 1-6.
Yoshino et al., Micromachining With a High Repetition Rate Femtosecond Fiber Laser, JLMN—Journal of Laser Micro/Nanoengineering, 2008, pp. 157-162, vol. 3, No. 3.
Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.
Nguyen et al., Optical Breakdown Versus Filamentation in Fused Silica by Use of Femtosecond Infrared Laser Pulses, Optics Letter, vol. 28, No. 17, Sep. 1, 2003, pp. 1591-1593, Department of Physics, Universite Laval, Quebec, Canada.
Nicholson, David, Laser Pulse Filamentation, Submitted Coursework for PH240, Stanford University, Nov. 27, 2011, pp. 1-4.
Zlotnicki, Steve, What Is Cutting Kerf, May 19, 2013, www.esab-cutting.com, pp. 1-4.
Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.
Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.
Hosseini, S. Abbas, System for Performing Laser Filamentation Within Transparent Materials, U.S. Appl. No. 14/336,912, filed Jul. 21, 2014, Applicant: Rofin-Sinar Technologies Inc.
Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.
Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.
Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies Inc.
Jha et al., An Integrated PCR Microfluidic Chip Incorporating Aseptic Electrochemical Cell Lysis and Capillary Electrophoresis

(56) References Cited

OTHER PUBLICATIONS

Amperometric DNA Detection for Rapid and Quantitative Genetic Analysis, The Royal Society of Chemistry, Lab on a Chip, 2012, 12, 4455-4464.
Applied Biosystems Chemistry Guide, DNA Sequencing by Capillary Electrophoresis, Second Edition, 2009, pp. 1-250.
PE Applied Biosystems, Automated DNA Sequencing, Chemistry Guide, 1998, pp. 1-245.
Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.
Muller et al, Short-Pulse Lasers Enable Transparent Materials Processing, Industrial Photonics, Oct. 2014, pp. 8-10.
Hosseini, S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies Inc.
Hosseini, S. Abbas, Electro/Mechanical Microchips and Method of Making With Burst Ultrafast Laser Pulses, U.S. Appl. No. 14/539,861, filed Oct. 12, 2014, Applicant: Rofin-Sinar Technolgies Inc.
Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies Inc.

\* cited by examiner

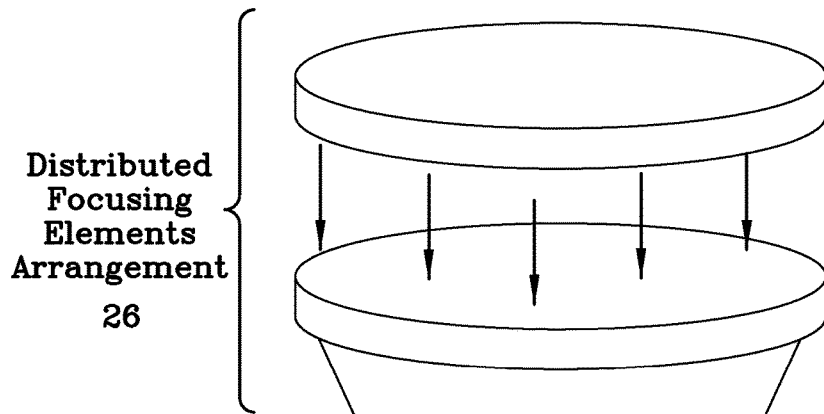
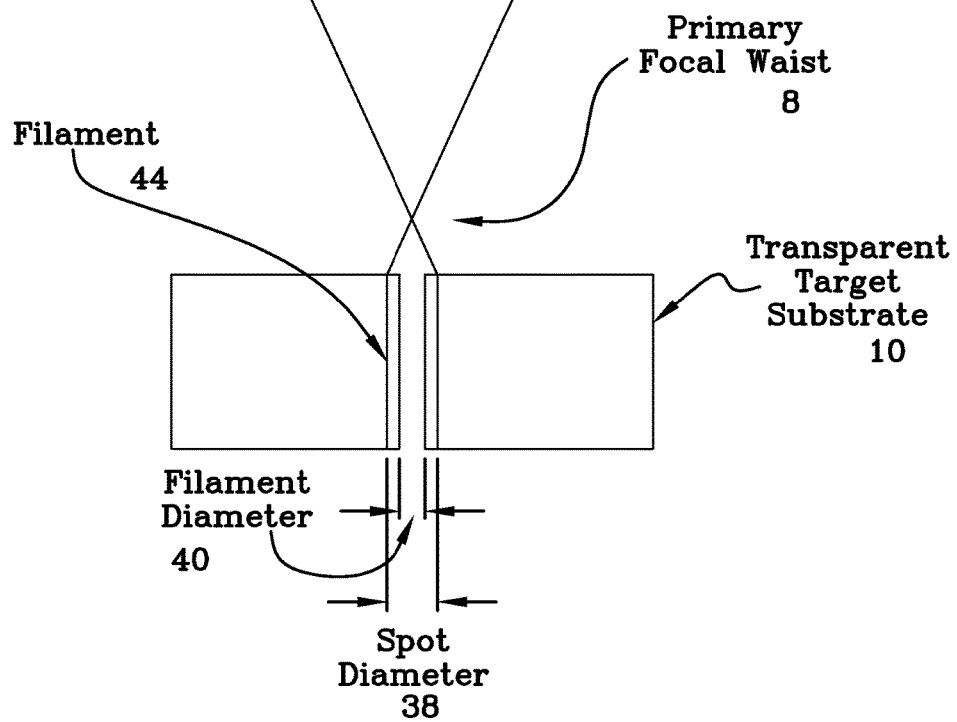
FIG. 4

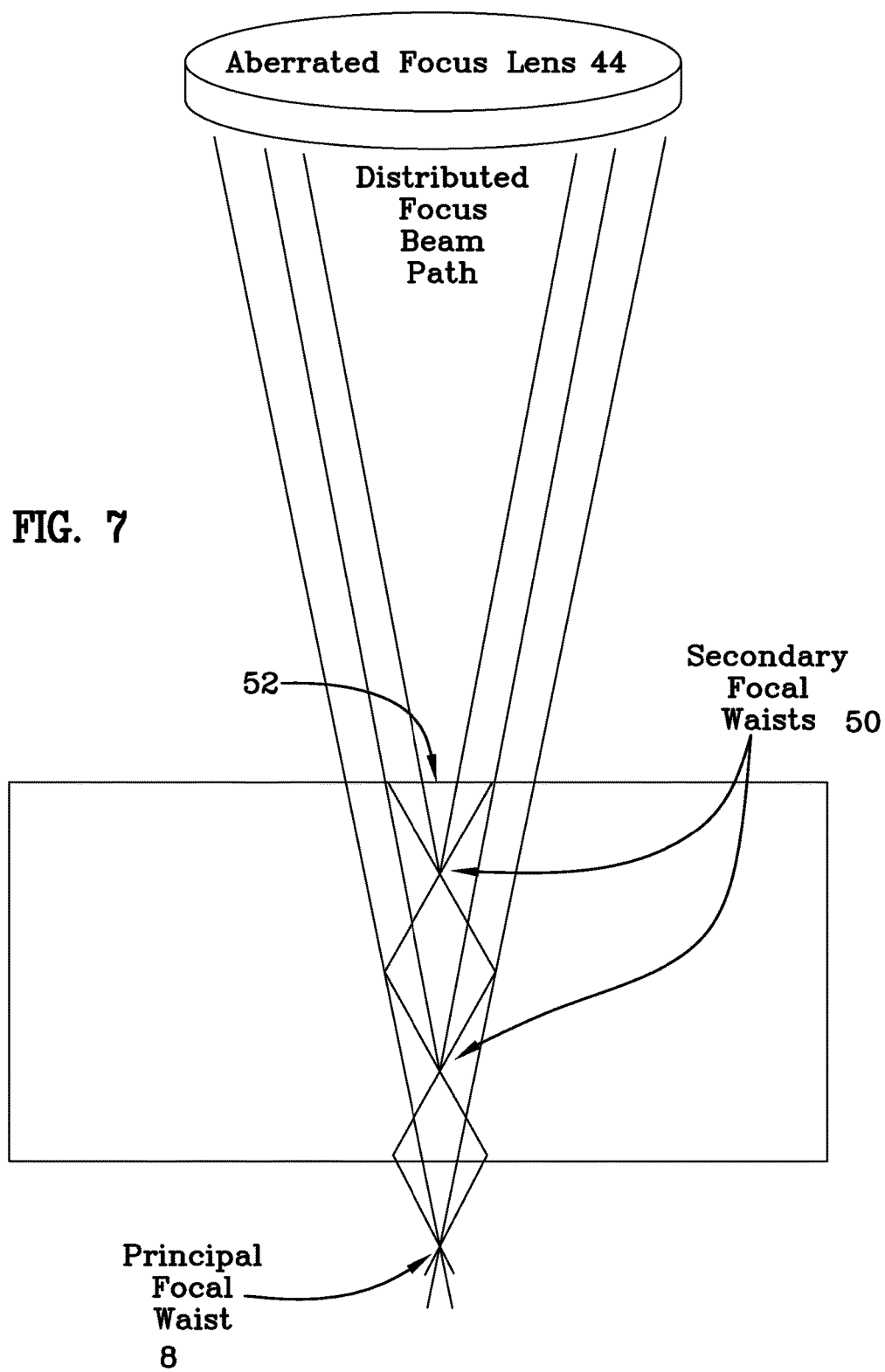

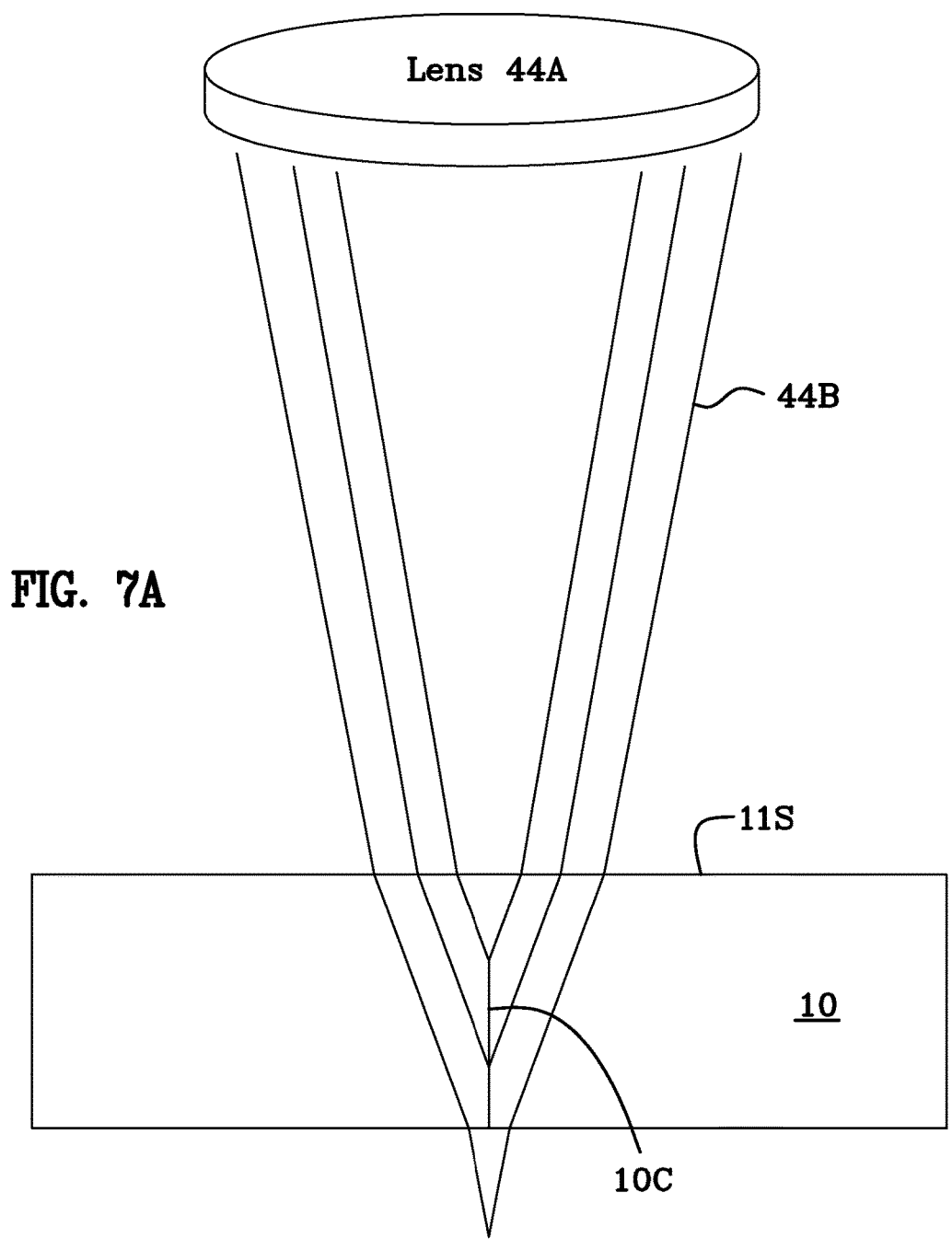

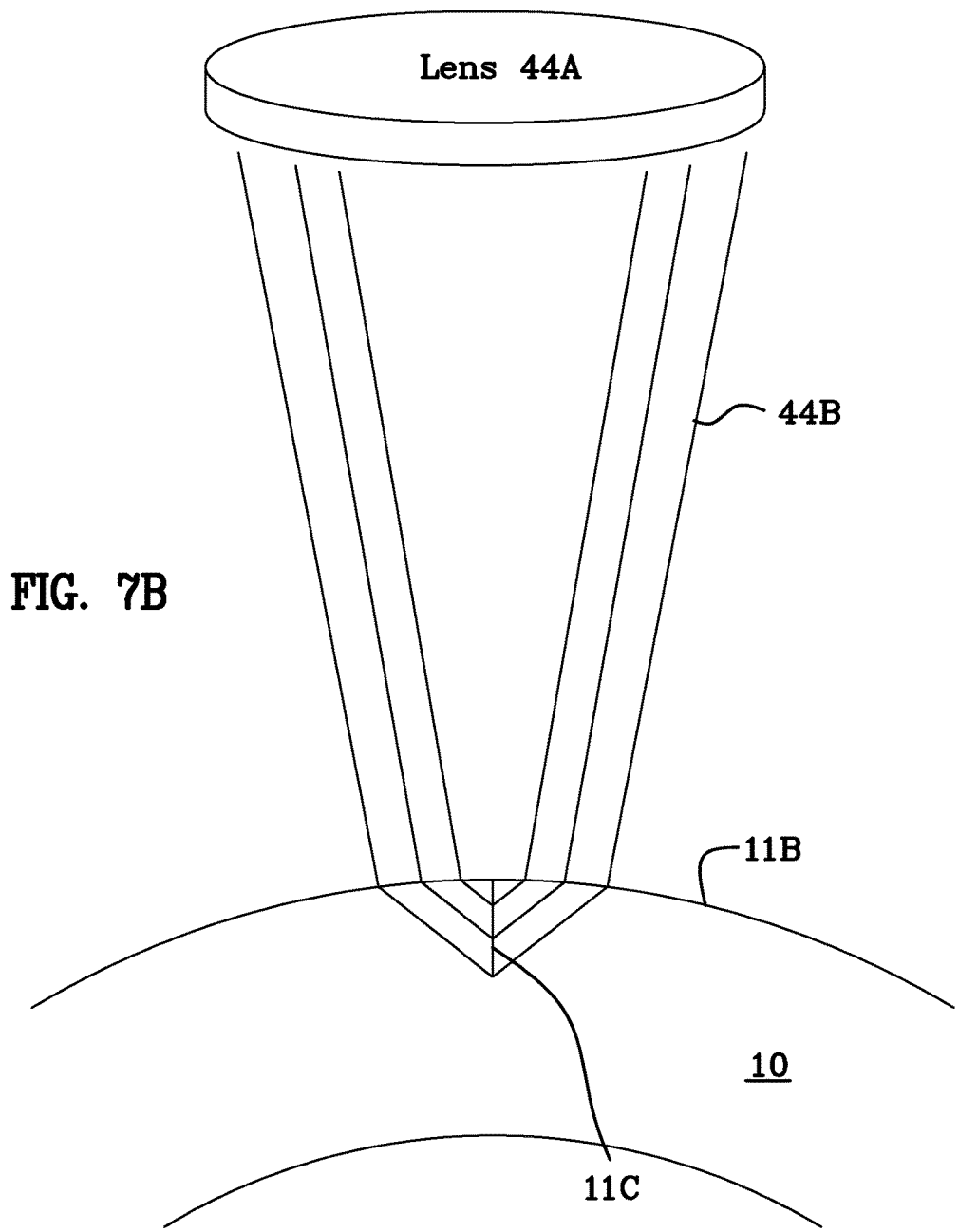

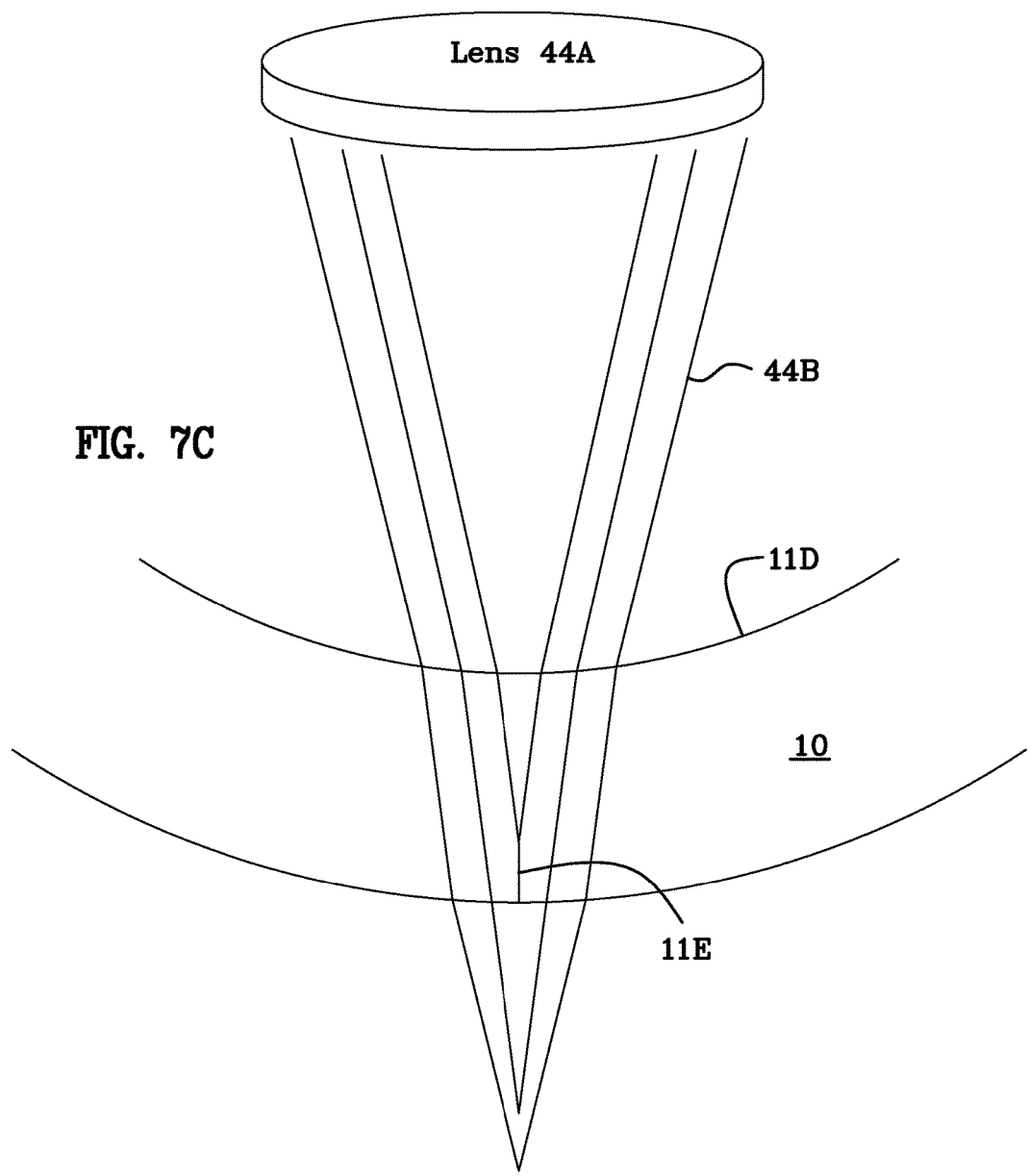

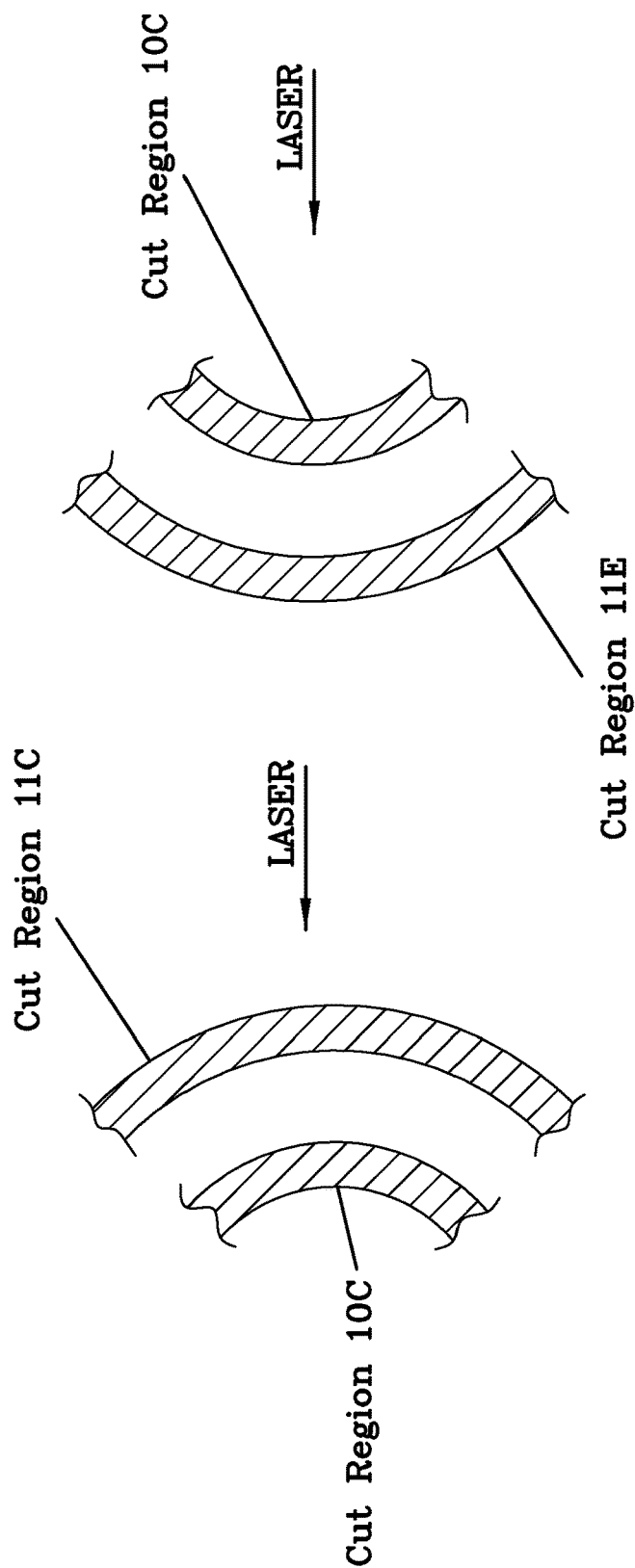

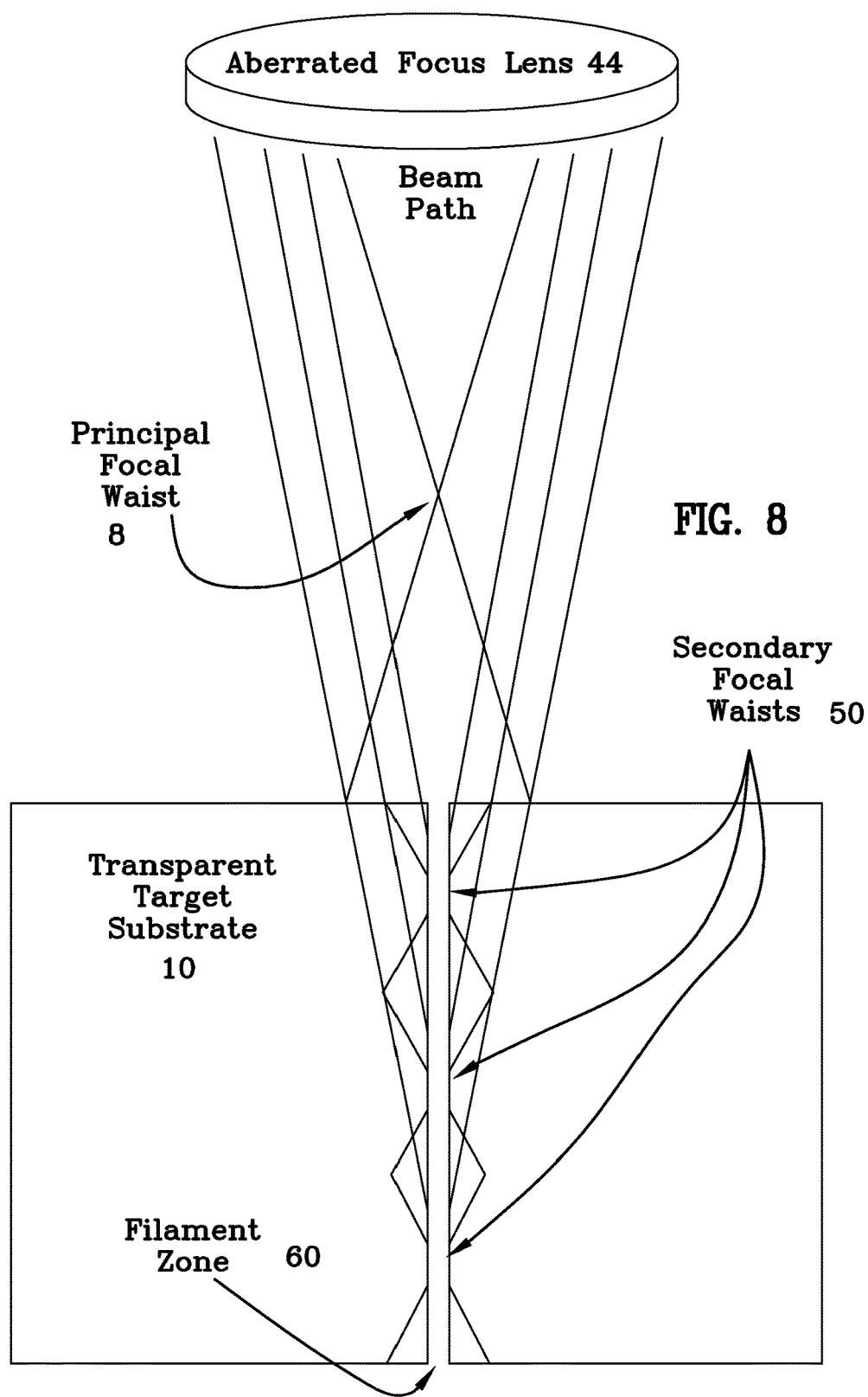

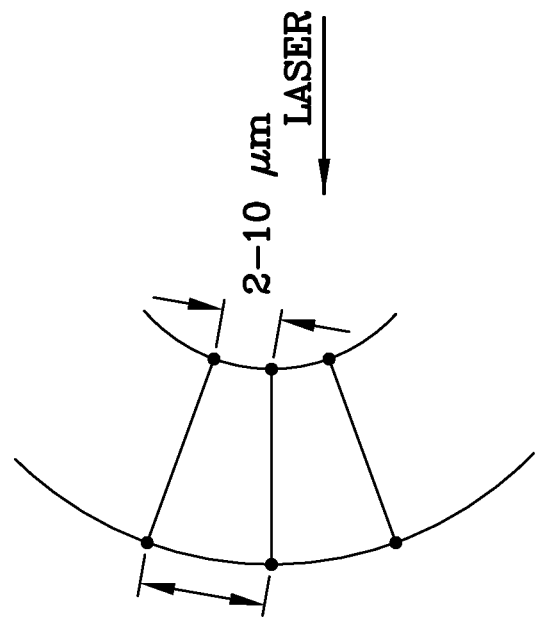
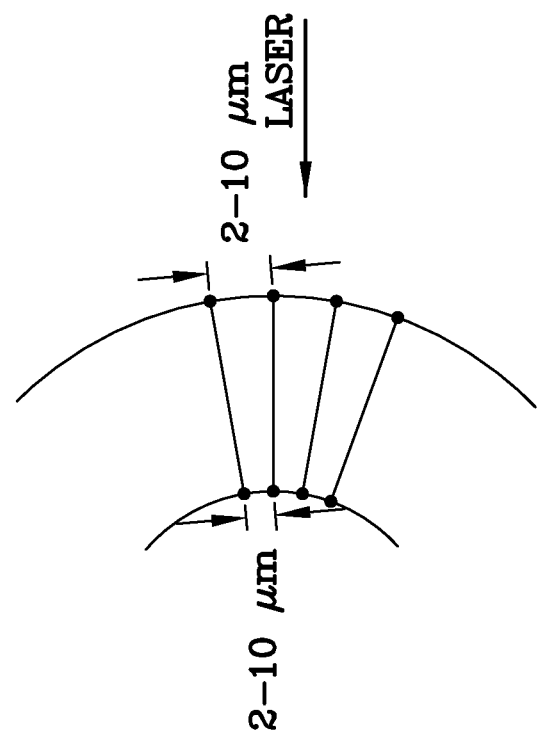
FIG. 20

METHOD AND APPARATUS FOR SPIRAL CUTTING A GLASS TUBE USING FILAMENTATION BY BURST ULTRAFAST LASER PULSES

This patent application claims priority to and the benefit of U.S. provisional patent application Ser. No. 61/906,321 filed Nov. 19, 2013. U.S. provisional patent application Ser. No. 61/906,321 filed Nov. 19, 2013 is incorporated herein in its entirety by reference hereto.

BACKGROUND OF THE INVENTION

The present invention relates to a non-ablative method and apparatus for spiral cutting a transparent tube (or generally any curved surface) using a material machining technique involving filamentation by burst ultrafast laser pulses that is better suited to mass production. The current method of making such cuts involves laser ablative machining which does not allow for as narrow or tight of a spiral to be cut, leaves rough edges and ejecta mounds about the perimeter of the spiral's edge. Additionally, the prior art imparts a plethora of collateral damage to the tube such as thermal transport, mechanical shocks, cracks, charring, discoloration, and surface melting in the nearby laser interaction zone.

Utilizing a glass substrate tube in conjunction with recent discoveries in transparent material laser machining (both methodology and equipment) will result in a simplified fabrication process that will eliminate the problems of the prior art resulting in a faster, economical system for spiral cutting transparent tubes (or curved surfaces) by using a material machining technique involving filamentation by burst ultrafast laser pulses would fulfill a long felt need in the industry. This new invention utilizes and combines known and new technologies in a unique and novel configuration to overcome the aforementioned problems and accomplish this.

SUMMARY

The general purpose of the present invention, which will be described subsequently in greater detail, is to provide an apparatus and method for enabling the spiral cutting of transparent curved surfaces. One prominent transparent material is glass and the invention can be used to machine glass that has been chemically strengthened or heat strengthened. The transparent material is selected from the group consisting of glass, borosilicate glass, chemically or heat strengthened glass, sapphire, $LiNbO_3$, Silicon, Ti:Sapphire, $LiTaO_3$, transparent ceramics, crystalline rods and GaN.

The present invention uses four novel, related methods of spiral cutting curved surfaces that involve two distinct methods that are only achievable because of filamentation by burst ultrafast laser pulses machining by the disclosed method. The prior art laser machining technology cannot be used to gain any fabrication or cost advantage in this process because it utilizes ablative cutting.

The following specification describes novel and unique methods to spirally cut transparent material such as borosilicate glass, although diamonds, Si, Sapphire or the like could also be utilized. The method disclosed has many of the advantages mentioned heretofore and many novel features that result in a new method of cutting curved transparent surfaces which is not anticipated, rendered obvious, suggested, or even implied by any of the prior art, either alone or in any combination thereof.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 4 is a diagrammatic view of the present invention utilizing a distributed focus lens arrangement;

FIG. 7 is a diagrammatic view of the present invention utilizing a distributed focus lens arrangement and the distribution of focal waists where the principal focus is below the target;

FIG. 7A is a diagrammatic view of the present invention utilizing an ordinary lens, a transparent substrate and a region of the substrate being cut;

FIG. 7B is a diagrammatic view of the present invention illustrating an ordinary lens, a transparent rube which is convexly curved with respect to the incoming laser beam and a region of the tube being cut;

FIG. 7C is a diagrammatic view of the present invention illustrating a transparent tube which is concavely curved with respect to the incoming laser beam and a region of the transparent tube being cut;

FIG. 7D is a diagrammatic view of the present invention illustrating a portion of the transparent tube which is convexly curved with respect to the incoming laser beam and regions of the transparent tube which are being cut;

FIG. 7E is a diagrammatic view of the present invention illustrating a portion of the transparent tube which is concavely curved with respect to the incoming laser beam and regions of the transparent tube which are being cut;

FIG. 8 is a diagrammatic view of the present invention of FIG. 6 wherein the orifice has been machined;

FIG. 20 is a diagrammatic view of incoming lasers drilling orifices in transparent tubes.

DETAILED DESCRIPTION

Figure 12:
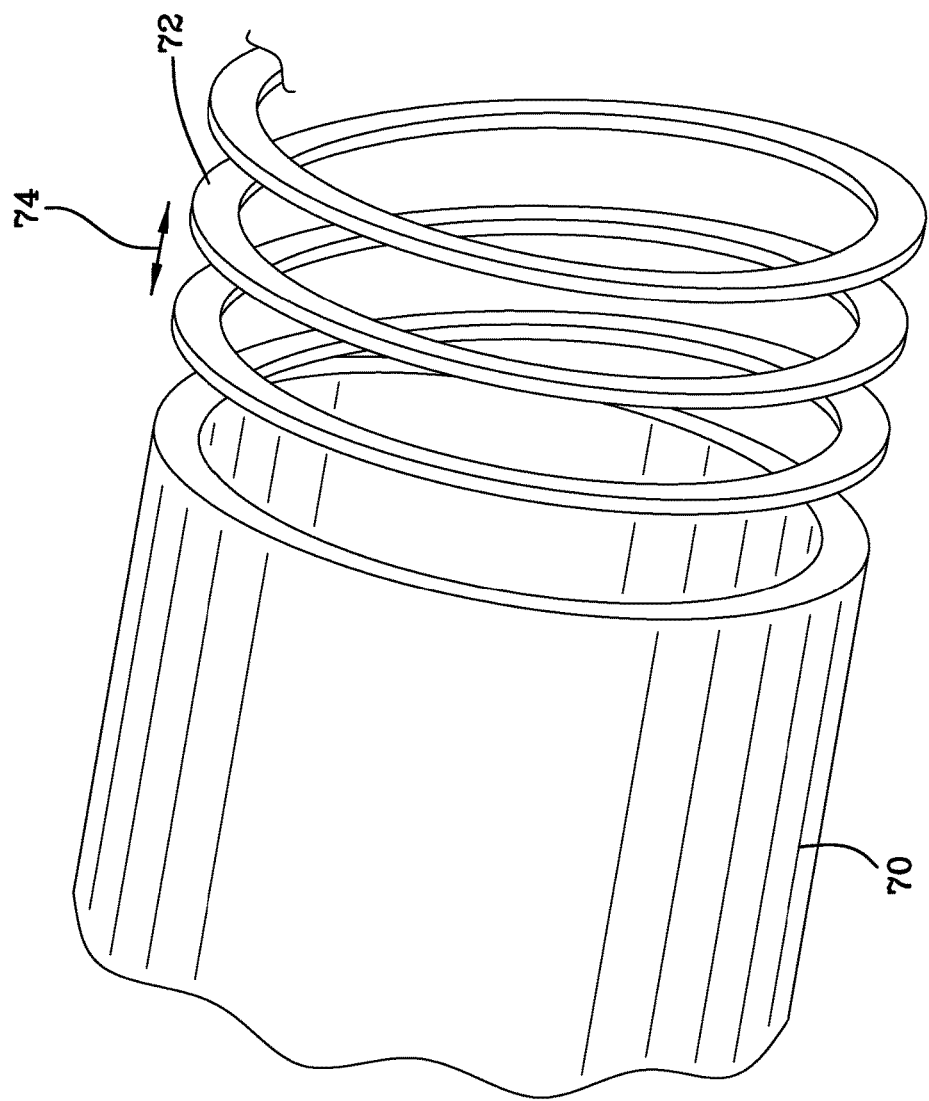
FIG. 12 is an illustration of a spirally cut transparent borosilicate tube.

Referring to FIG. 12, is an illustration of a spirally cut borosilicate tube, one can see the applicability of being able to cleanly, cut curved surfaces from transparent materials. Here a borosilicate glass tube 70 has been cut into a spiral 72 with thin enough spacing 74 to allow flexibility of the assembly for slight elongation.

Figure 12A:
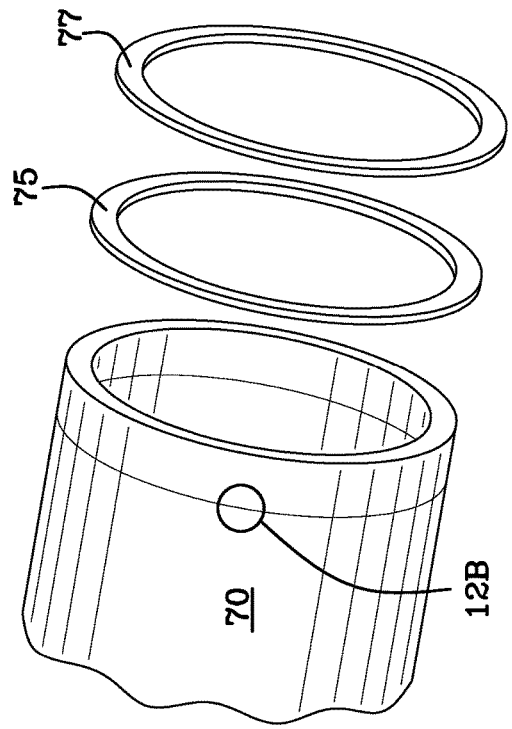
FIG. 12A is an illustration of two sections cut from a transparent tube.
Figure 12B:
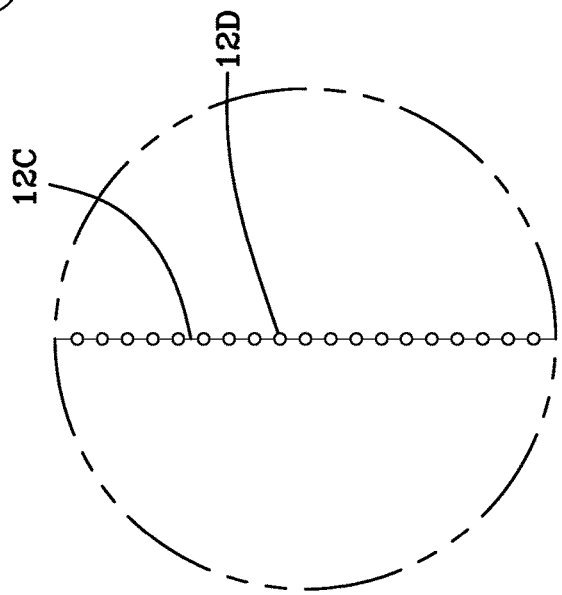
FIG. 12B is an enlargement of a portion of the tube illustrating orifices in the transparent tube and microcracks between the orifices.

FIG. 12A is an illustration of two sections 75, 77 cut from a transparent tube 70. FIG. 12B is an enlargement of a portion of the tube illustrating orifices 12D in the transparent tube 70 and microcracks 12C between the orifices.

The present invention discloses four related methods of cutting a glass tube using filamentation by burst of ultrafast laser pulses with specific adjustments of the laser parameters in conjunction with a distributed focus lens assembly that creates a plurality of different foci wherein the principal focal waist never resides in or on the surface of the target so as to create a filament in the material that develops a cut line anywhere about the surface of the tube whether it be in the front, along the sides or the back. While the present disclosure focuses primarily on the cutting (machining) of a spiral from a glass tube, it is understood that the system and method described herein are equally applicable to the cutting of curved surfaces in other transparent targets such as glass, diamonds, silicon, sapphire, ceramics and the like. The apparatus and methodology employed will be detailed herein as the laser machining technology and system and the spiral tube cutting methodology.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The Laser Machining Technology and System

Stopped or through orifices may be drilled beginning at any depth, or in any one of a set of stacked wafers, plates or substrates, primarily, but not limited to, transparent materials such that the structural characteristics of the orifice and surrounding material exceed that found in the prior art. Movement of the laser beam in relation to the target substrate offers machining in the form of substrate (target) slicing or cutting. This can be accomplished in any or each member of a stacked array of materials by a novel method using filamentation of burst of ultrafast laser pulses wherein the laser light and focusing parameters have been adjusted to create a filament inside the material that can create an orifice or cut through a specified depth of the transparent substrate.

Unless defined otherwise, all technical and scientific terms used herein are intended to have the same meaning as commonly understood to one of ordinary skill in the art. Unless otherwise indicated, such as through context, as used herein, the following terms are intended to have the following meanings.

As used herein, the term "photoacoustic cutting" refers to a method of machining a target (generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated ejecta and minimized microcrack formation in the material. This phenomena is also known as "photoacoustic compression".

As used herein, the term "filament modified zone" refers to a filament region within a substrate characterized by a region of compression defined by the optical beam path.

As used herein, the phrases "burst", "burst mode", or "burst pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of pulses may be formed with variations in the intensities or energies of the pulses making up the burst. See FIGS. 9-11.

The following methodology will provide fast, reliable and economical non-ablative laser machining technique to initiate orifices (stopped/blind or through orifices) in the target material that may be initiated below or above a single or multiple stacked target material (or on either side of a tube) by filamentation by a burst(s) of ultrafast laser pulses. The movement of the laser beam with respect to the target material will direct the filament to cut or slice the target. Ultra short lasers offer high intensity to micromachine, to modify and to process surfaces cleanly by aggressively driving multi-photon, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material. The filament formed by the fabrication unit's direction/steering can be used to drill orifices, cut, and scribe or dice a surface or volume of a target.

Generally, in the prior art, laser ablation techniques that utilize a high energy pulsed laser beam that is focused to a single principal focus above, within or at a surface of the material, have been used to machine transparent materials. Main issue is slow speed process, facets with microcracks, and wide kerf width with debris on the surface. Beside cut walls always have angle and cuts cannot be done in sharply in the vertical direction.

Propagation of intense ultrafast laser pulses in different optical media has been well studied. Nonlinear refractive index of a material is a function of laser intensity. Having an intense laser pulse with Gaussian profile, wherein the central part of the pulse has much higher intensity than the tails, means the refractive index varies for the central and surrounding areas of the material seeing the laser beam pulse. As a result, during propagation of such laser pulse, the pulse collapses automatically. This nonlinear phenomenon is known in the industry as self-focusing. Self-focusing can be promoted also using a lens in the beam path. In the focal region the laser beam intensity reaches a value that is sufficient to cause multiple-ionization, tunnel ionization and avalanche ionization, which creates plasma in the material. Plasma causes the laser beam to defocus but due to high peak power pulse refocuses back to form the next plasma volume. The inherent problem with a single sharp focus in a non-distributed beam is that the process ends after the laser pulses lose all their energy and are unable to refocus as discussed below.

This ablative method develops a plasma volume in the material until it exceeds the optical breakdown threshold for that material and optical breakdown (OB) occurs. At OB the maximum threshold fluence (the energy delivered per unit area, in units of $J/m^2$) is reached and the orifice diameter narrows and ablative machining or drilling ceases to proceed any deeper. This is the obvious drawback to using the prior art methods as they limit the size of the orifice that can be drilled, cause a rough orifice wall and result in an orifice with a taper having a different diameter at the top and bottom surfaces of the target. This occurs because in ablative machining, the beam has central focus (also referred to as a principal focal waist) at the surface of the target causing localized heating and thermal expansion therein heating the surface of the material to its boiling point and generating a keyhole. The keyhole leads to a sudden increase in optical absorptivity quickly deepening the orifice. As the orifice deepens and the material boils, vapor generated erodes the molten walls blowing ejecta out and further enlarging the orifice. As this occurs, the ablated material applies a pulse of high pressure to the surface underneath it as it expands. The effect is similar to hitting the surface with a hammer and brittle materials are easily cracked. Additionally, brittle materials are particularly sensitive to thermal fracture which is a feature exploited in thermal stress cracking but not desired in orifice drilling. Any one or combination of these effects causes the beam to scatter from this point or be fully absorbed not leaving enough beam power (fluence) to drill down through the material any further. Additionally, this creates a distortion or roughness known as the ablative ejecta mound found around the initiating point at the surface of the target substrate.

The present invention solves the optical breakdown problem, minimizes the orifice roughness and the ablative ejecta mound, and eliminates the tapering diameter orifice.

Figure 1:
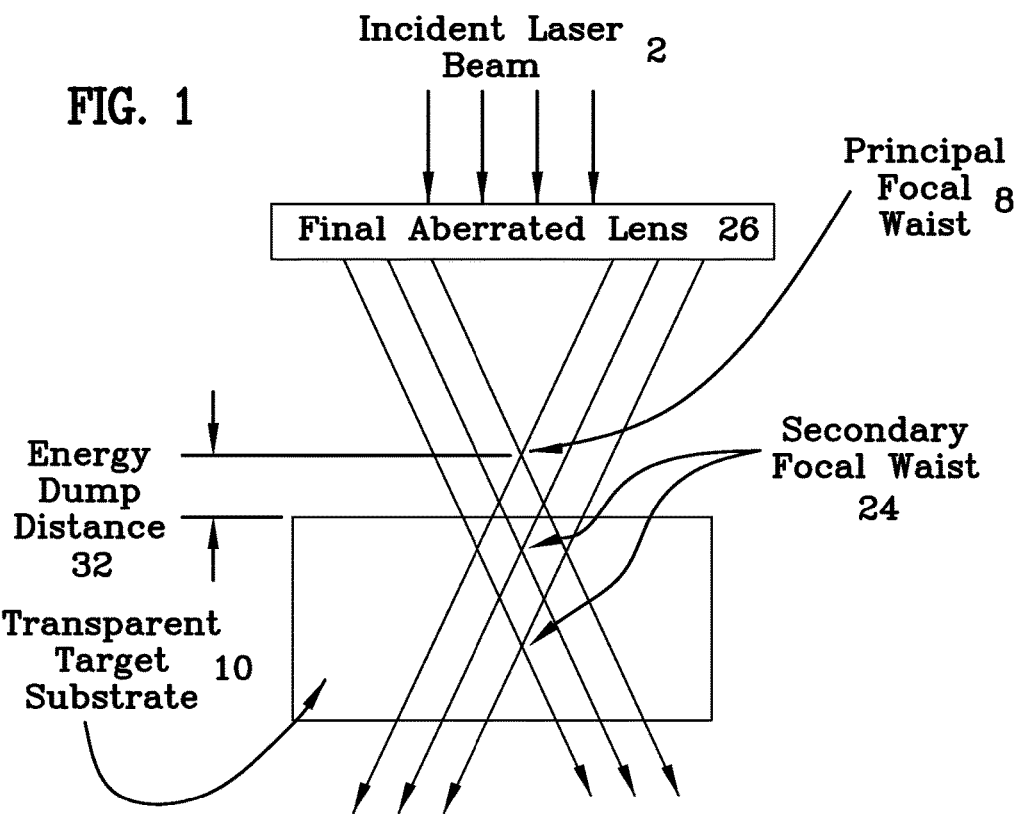
FIG. 1 is a diagrammatic representation of the laser machining arrangement of the present invention wherein the primary focus occurs above the top surface of the transparent substrate.

Referring to FIG. 1, the present disclosure provides devices, systems and methods for the processing of orifices in transparent materials by laser induced photoacoustic compression. FIG. 1 is a diagrammatic representation of the laser machining arrangement of the present invention wherein the principal focus occurs above the top surface of the transparent substrate. Unlike previously known methods of laser material machining, embodiments of the present invention utilize an optical configuration that focuses the incident beam 2 in a distributed manner along the longitudinal beam axis such that there is a linear alignment of the principal focus 8 and secondary foci 24 (coincident to the linear axis of the orifice but vertically displaced from the principal focus or focal waist) to allow the continual refocusing of the incident beam 2 as it travels through the material 10 thereby enabling the creation of a filament that modifies the index of refraction along the beam path in the material 10 and does not encounter optical breakdown (as seen in the prior art ablative drilling systems both with and without the use of rudimentary filamentation) such that continued refocusing of the laser beam in the target material can continue over long distances.

Figure 2:
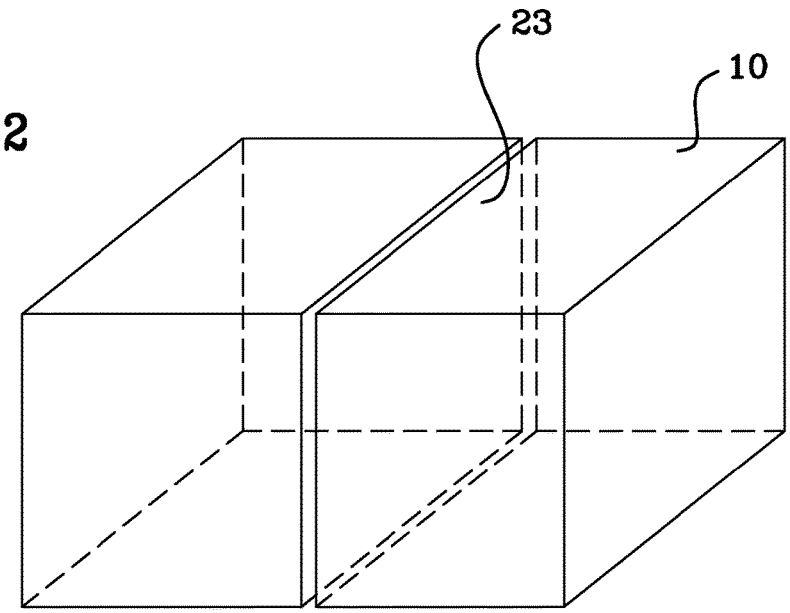
FIG. 2 is a perspective view of an orifice scribe in a transparent substrate formed by the laser machining arrangement of the present invention.

Still referring to FIG. 1, this distributed focusing method allows for the "dumping" or reduction of unnecessary energy from the incident beam 2 found at the principal focal waist 8 by the creation of secondary foci 24 by the distributed focusing elements assembly 26, and by positioning the location of the principal focal waist 8 from on or in the material, to outside the material 10. This dumping of beam fluence combined with the linear alignment of the principal focal waist 8 and secondary focal waists 24, enables the formation of filaments over distances while maintaining sufficient laser intensity (fluence $\mu J/cm^2$) to accomplish actual modification and compression over the entire length of the filament zone. This distributed focusing method supports the formation of filaments with lengths well beyond one millimeter and yet maintaining an energy density beneath the optical breakdown threshold of the material with intensity enough so that even multiple stacked substrates can be drilled simultaneously across dissimilar materials (such as air or polymer gaps between layers of target material)

with negligible taper over the drilled distance, and a relatively smooth walled orifice wall that can be initiated from above, below or within the target material. FIG. 2 is a perspective view of an orifice scribe in a transparent substrate formed by the laser machining arrangement of the present invention. Propagating a non-tapered wall slit 23 in a target 10 is accomplished by the relative movement of the target 10 while machining an orifice.

The optical density of the laser pulse initiates a self focusing phenomena and generates a filament of sufficient intensity to non-ablative initial photoacoustic compression in a zone within/about/around the filament so as to create a linear symmetrical void of substantially constant diameter coincident with the filament, and also causes successive self focusing and defocusing of said laser pulse that coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed.

Figure 3:
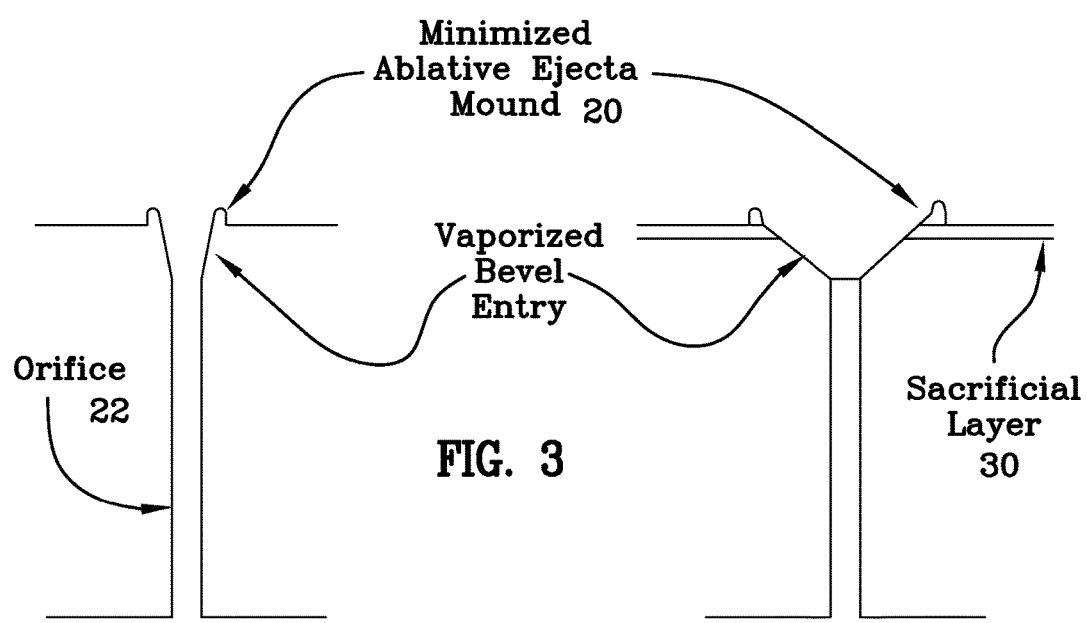
FIG. 3 is a representative side view of two orifices machined by the laser arrangement of FIG. 1.

It is known that the fluence levels at the surface of the target 10 are a function of the incident beam intensity and the specific distributed focusing elements assembly, and are adjusted for the specific target material(s), target(s) thickness, desired speed of machining, total orifice depth and orifice diameter. Additionally, the depth of orifice drilled is dependant on the depth over which the laser energy is absorbed, and thus the amount of material removed by a single laser pulse, depends on the material's optical properties and the laser wavelength and pulse length. For this reason a wide range of process parameters are listed herein with each particular substrate and matching application requiring empirical determination for the optimal results with the system and materials used. As such, the entry point on the target 10 may undergo some minimal ablative ejecta mound formation 20 if the fluence levels at the surface are high enough to initiate momentary, localized ablative (vaporized) machining, although this plasma creation is not necessary. In certain circumstances it may be desirable to utilize a fluence level at the target surface that is intense enough to create the transient, momentary ablative drilling to give a broad bevelled entry yet have the remainder of the orifice 22 of uniform diameter as would be created by a distributed focus hybrid drilling method using an energy level that permits a momentary ablative technique followed by a continual photo acoustic compression technique. FIG. 3 is a representative side view of two orifices machined by the laser arrangement of FIG. 1.

This can be accomplished by the present invention by selection of a fluence level at the target surface that balances the linear absorption against the non linear absorption of the beam in the material such that the fluence level required for ablative machining will be exhausted at the desired depth of the bevelled (or other geometric configuration). This hybrid technique will result in a minor ejecta mound 20 that can be eliminated if a sacrificial layer 30 is applied to the target surface. Common sacrificial layers are resins or polymers such as but not limited to PVA, Methacrylate or PEG, and generally need only be in the range of 1 to 300 microns thick (although the 10-30 micron range would be commonly utilized for transparent material machining) and are commonly applied by spraying the sacrificial layer onto the target material. The sacrificial layer will inhibit the formation of an ejecta mound on the target 10 by preventing molten debris from attaching itself to the surface, attaching instead to the removable sacrificial material as is well known in the art.

To accomplish photoacoustic compression machining requires the following system:
  A burst ultrafast pulse laser system capable of generating a beam comprising a programmable train of pulses containing from 1 to 50 subpulses within the burst pulse envelope. Further the laser system needs to be able to generate average power from 1 to 200 watts depending on the target material utilized, typically this range would be in the range of 50 to 100 Watts for borosilicate glass.
  A distributed focusing element assembly (potentially comprising positive and negative lenses but having a positive focusing effect in the aggregate) capable of producing a weakly convergent, multi foci spatial beam profile where the incident fluence at the target material is sufficient to cause Kerr-effect self-focusing and propagation.
  An optical delivery system capable of delivering the beam to the target.

Commercial operation would also require translational capability of the material (or beam) relative to the optics (or vice versa) or coordinated/compound motion driven by a system control computer.

The use of this system to drill photoacoustic compression orifices requires the following conditions be manipulated for the specific target(s): the properties of the distributed focus element assembly; the burst pulsed laser beam characteristics; and the location of the principal focus.

The distributed focus element assembly 26 may be of a plethora of generally known focusing elements commonly employed in the art such as aspheric plates, telecentric lenses, non-telecentric lenses, aspheric lenses, annularly faceted lenses, custom ground aberrated (non-perfect) lenses, a combination of positive and negative lenses or a series of corrective plates (phase shift masking), any optical element tilted with respect to the incident beam, and actively compensated optical elements capable of manipulating beam propagation. The principal focal waist of a candidate optical element assembly as discussed above, generally will not contain more than 90% nor less than 50% of incident beam fluence at the principal focal waist. A sample optical efficiency for drilling a 1 micron diameter through orifice (as illustrated in FIG. 4) in a 2 mm thick single, planar target made of borosilicate with a 1064 nm wavelength, 50 watt laser outputting 5 pulses (at 50 MHz) in each burst with 50 µJ/pulse energy having a frequency (repetition rate) that would lie in the 200 k Hz range is 65% wherein the principal focal waist of the beam resides 0.5 mm off of the desired point of initiation.

Figure 5:
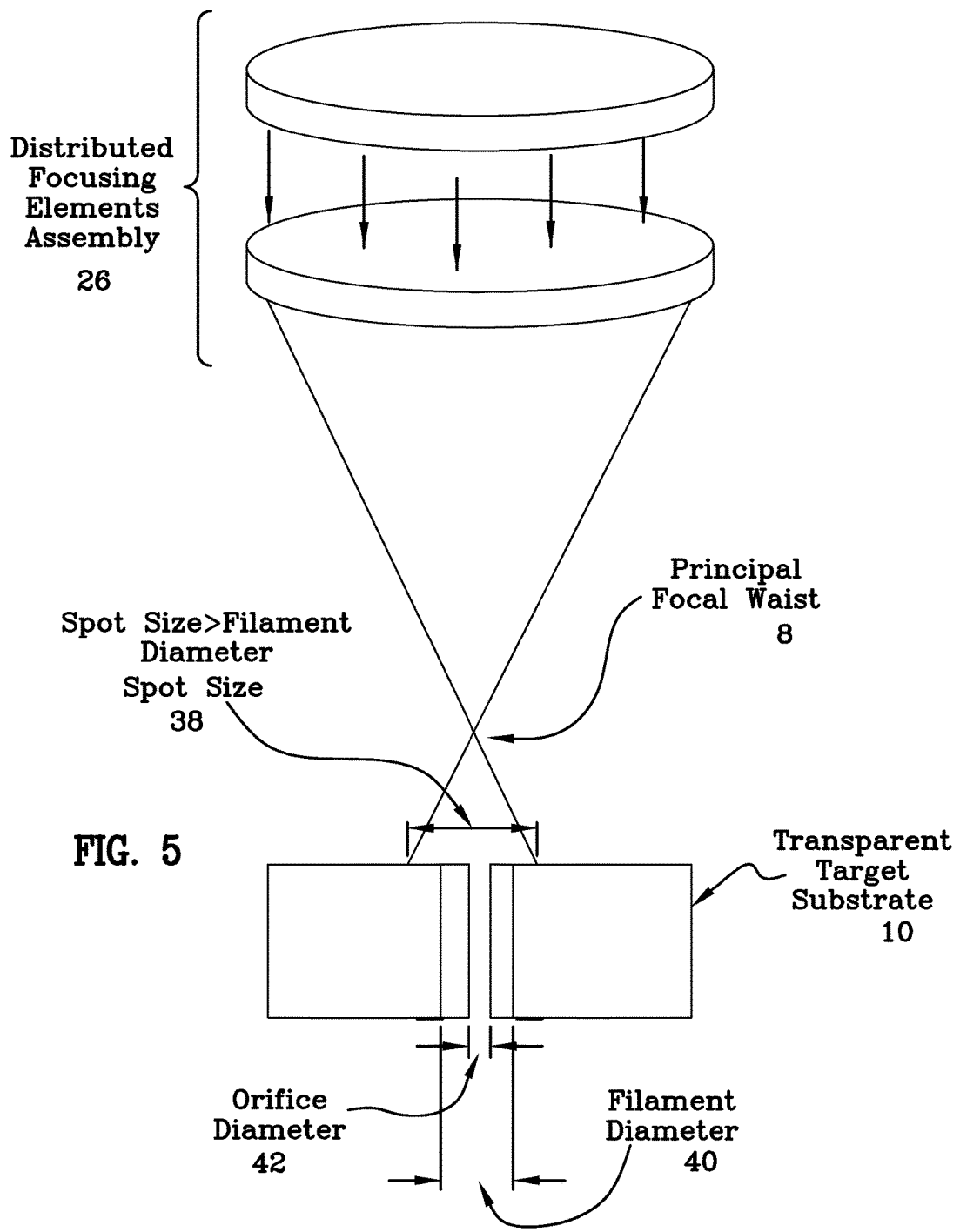
FIG. 5 is a another diagrammatic view of the present invention utilizing a distributed focus lens arrangement.

FIG. 4 is a diagrammatic view of the present invention utilizing a distributed focus lens arrangement. FIG. 5 is another diagrammatic view of the present invention utilizing a distributed focus lens arrangement. It is to be noted that there is also a set of physical parameters that must be met by this photoacoustic compression drilling process. Referring to FIGS. 4 and 5 it can be seen that the beam spot diameter 38>the filament diameter 40>the orifice diameter 42. Additionally the distributed beam's primary focal waist 8 is never in or on the surface of the target material 10 into which a filament is created.

The location of the principal focal waist 8 is generally in the range of 5 to 500 um off of the desired point of initiation. This is known as the energy dump distance. It also is determined by the creation an empirical table tailored for each transparent material, the physical configuration and characteristics of the target as well as the laser parameters. It is extrapolated from the table created by the method noted above.

Figure 9:
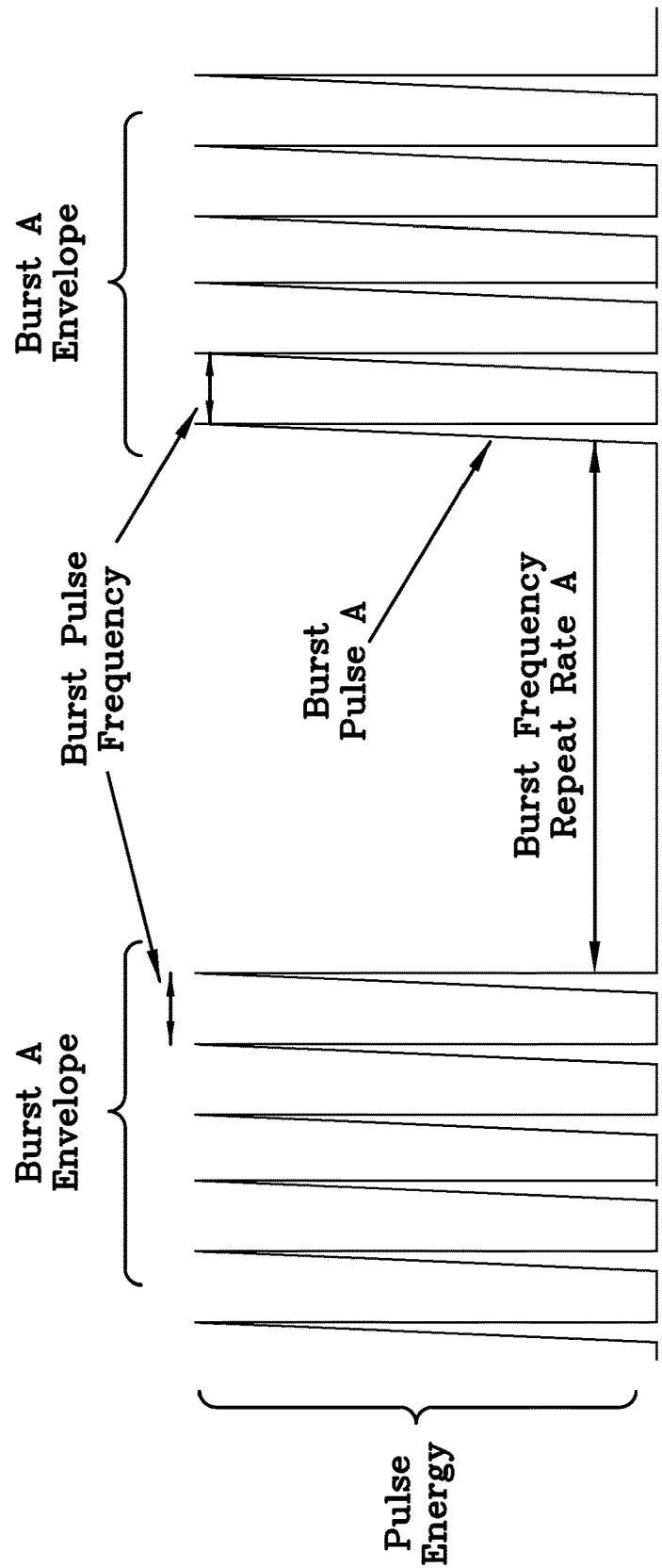
FIGS. 9-11 show three various configurations of the distribution of laser energy.
Figure 10:
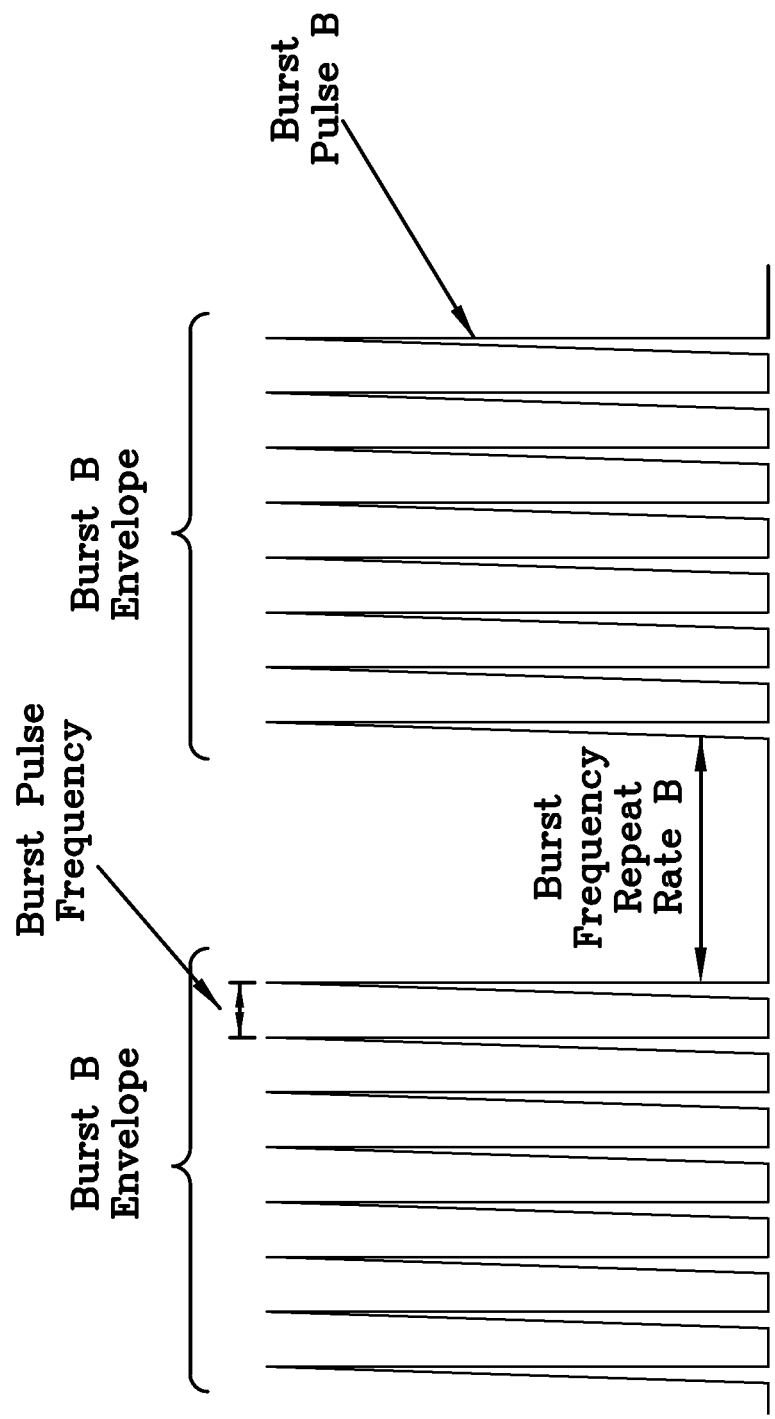
Figure 11:
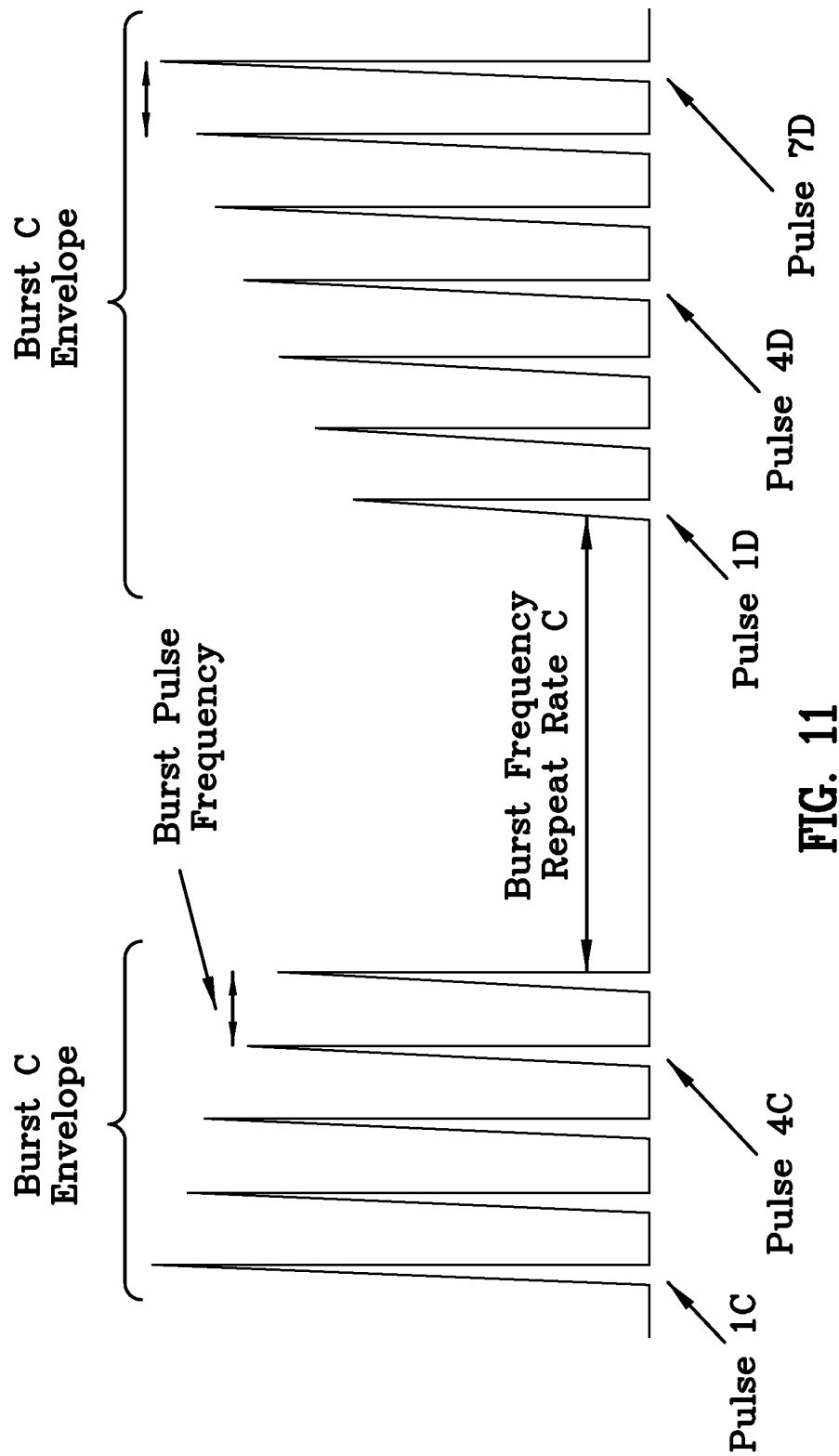

FIGS. 9-11 illustrate examples of three different temporal energy distributions of a burst pulsed laser signal.

Figure 6:
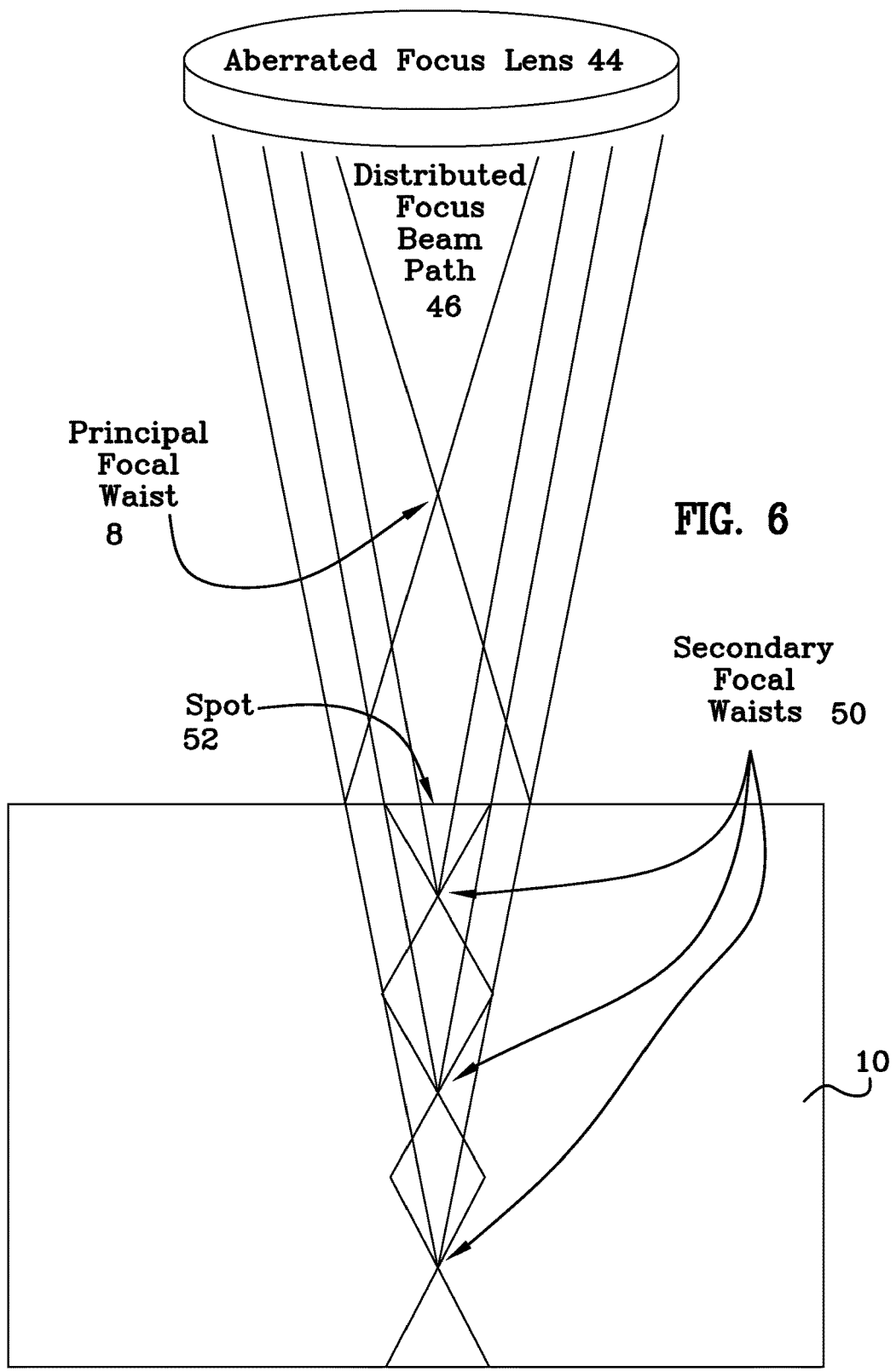
FIG. 6 is a diagrammatic view of the present invention utilizing a distributed focus lens arrangement and the distribution of focal waists where the principal focus is above the target.

Referring to FIGS. 6, 7 and 8 collectively, the mechanism of the present invention can best be illustrated. Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament.

The actual physical process occurs as described herein. The principal focal waist of the incident light beam of the pulsed burst laser is delivered via a distributed focusing element assembly to a point in space above or below (but never within) the target material in which the filament is to be created. This will create on the target surface a spot as well as white light generation. The spot diameter on the target surface will exceed the filament diameter and the desired feature (orifice, slot, etc.) diameter. The amount of energy thus incident in the spot on surface being greater than the critical energy for producing the quadratic electro-optic effect (Kerr effect—where the change in the refractive index of the material is proportional to the applied electric field) but is lower than the critical energy required to induce ablative processes and more explicitly below the optical breakdown threshold of the material. Self-focusing occurs above a critical power that satisfies the filament formation. Photoacoustic compression proceeds as a consequence of maintaining the required power in the target material over time scales such that balancing between the self-focus condition and the optical breakdown condition can be maintained. This photoacoustic compression is the result of a uniform and high power filament formation and propagation process whereby material is rearranged in favor of removal via ablative processes. The extraordinarily long filament thus produced is fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target. By focusing the energy of the second foci at a lower level below the substrate surface but at the active bottom face of the filament event, allows the laser energy access to the bulk of the material while avoiding absorption by plasma and scattering by debris.

The distributed focal element assembly can be a single aberrated focal lens placed in the path of the incident laser beam to develop what appears to be an unevenly distributed focus of the incident beam into a distributed focus beam path containing a principal focal waist and a series of linearly arranged secondary focal waists (foci). The alignment of these foci is collinear with the linear axis of the orifice 42. Note that the principal focal waist 8 is never on or in the target material 10.

FIG. 6 is a diagrammatic view of the present invention utilizing a distributed focus lens arrangement and the distribution of focal waists where the principal focus is above the target. In FIG. 6 the principal focal waist is above the target material and in FIG. 7 it is below the target material 10 as the orifice 42 may be initiated above or below the principal focal waist 8 by virtue of the symmetric and non-linear properties of the focused beam. FIG. 7 is a diagrammatic view of the present invention utilizing a distributed focus lens arrangement and the distribution of focal waists where the principal focus is below the target.

Thus a beam spot 52 (approximately 10 μm distance) resides on the surface of the target 10 and the weaker secondary focal waists collinearly reside within the target because the material acts as the final optical element creating these focal points as the electric field of the laser alters the indices of refraction of the target. See FIG. 7.

FIG. 8 is a diagrammatic view of the present invention of FIG. 6 wherein the orifice has been machined. This distributed focus allows the amount of laser energy to be deposited in the material so as to form a filament line or zone 60. With multiple linear aligned foci and by allowing the material to act as the final lens, the target material when bombarded with ultrafast burst pulse laser beams, undergoes numerous, successive, localized heatings which thermally induced changes in the material's local refractive index along the path of the liner aligned foci causing a lengthy untapered filament 60 to be developed in the target followed by an acoustic compression wave that annularly compresses the material in the desired region creating a void and a ring of compressed material about the filamentation path. Then the beam refocuses and the refocused beam combined with the energy at the secondary focal waists maintains the critical energy level and this chain of events repeats itself so as to drill an orifice capable of 3000:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

FIG. 7A is a diagrammatic view of the present invention utilizing an ordinary lens 44A, a transparent substrate 10 which illustrates a region 10C of the substrate being cut being cut by the burst ultrafast laser pulses which are in the incoming beam 44B. Reference numeral 11S denotes the surface of the substrate 10 which is along the flat direction of the tube. FIG. 7B is a diagrammatic view of the present invention illustrating an ordinary lens 44A, a transparent tube 10 which is convexly curved with respect to the incoming laser beam 44B and a region 11C of the tube being cut. Due to a mismatch in focus in flat or curved direction of the incident laser beam, two regions of filaments form (10C and 11C) with a distance are shown in FIG. 7D FIG. 7C is a diagrammatic view of the present invention illustrating a transparent tube 10 which is concavely curved with respect to the incoming laser beam 44B and a region 11E of the transparent tube being cut. Surface 11D of the tube is illustrated in FIG. 7C. Due to a mismatch in focus in flat and curved direction of the incident laser beam, two regions of filaments form as shown in FIG. 7E, 11E is due to curved surface and 10C is due to flat surface. Attention should be paid in that to form 11E the focus is moved up and as a consequence 10C is also moved up comparing to FIG. 7A.

Using an aberrated lens 44 in FIG. 7 resolved the focus mismatched issue.

The method of drilling orifices is through photoacoustic compression is accomplished by the following sequence of steps:

1. passing laser energy pulses from a laser source through a selected distributive-focus lens focusing assembly;

2. adjusting the relative distance and or angle of said distributive-focus lens focusing assembly in relation to a laser source so as to focus the laser energy pulses in a distributed focus configuration to create a principal focal waist and at least one secondary focal waist;

3. adjusting the principal focal waist or the target such that the principal focal waist will not reside on or in the target that is being machined;

4. adjusting the focus such that the spot of laser fluence on the surface of the target that is located below or above said principal focal waist has a diameter that is always larger than a diameter of a filament that is formed in the target;

5. adjusting the fluence level of the secondary focal waists are of sufficient intensity and number to ensure propagation of a photoacoustic compressive machining through the desired volume of the target;

6. applying at least one burst of laser pulses of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater than the critical energy level required to initiate and propagate photoacoustic compression machining, yet is lower than the threshold critical energy level required to initiate ablative machining; and 7. stopping the burst of laser pulses when the desired machining has been completed.

As mentioned earlier, there may be specific orifice configurations wherein a tapered entrance to the orifice may be desired. This is accomplished by initiation of the orifice with a laser fluence level that is capable of ablative machining for a desired distance and completing the drilling with a laser fluence level below the critical level for ablative machining yet above the critical level for photo-acoustic machining to the desired depth in that material. This type of orifice formation may also utilize the application of a removable sacrificial layer on the surface of the target. This would allow the formation of the ejecta mound onto the sacrificial layer such that the ejecta mound could be removed along with the sacrificial layer at a later time.

Such an orifice drilled by a hybrid ablative and photoacoustic compression method of machining would be performed through the following steps, although the application of the sacrificial layer need be utilized and if utilized need not occur first:

1. applying a sacrificial layer to at least one surface of a target;

2. passing laser energy pulses from a laser source through a selected distributive-focus lens focusing assembly;

3. adjusting the relative distance and or angle of said distributive-focus lens focusing assembly in relation to a laser source so as to focus the laser energy pulses in a distributed focus configuration to create a principal focal waist and at least one secondary focal waist;

4. adjusting the principal focal waist or the target such that the principal focal waist will not reside on or in the target that is being machined;

5. adjusting the focus such that the spot of laser fluence on the surface of the target that is located below or above said principal focal waist;

6. adjusting the spot of laser fluence on the surface of the target such that it has a diameter that is always larger than a diameter of a filament that is to be formed in the target;

7. ensuring the fluence level of the secondary focal waists are of sufficient intensity and number to ensure propagation of a photoacoustic compressive machining through the desired volume of the target;

8. applying at least one burst of laser pulses of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater than the critical energy level required to initiate ablative machining to the desired depth and thereinafter the fluence energy at the bottom of the ablatively drilled orifice is greater than the critical energy level to initiate and propagate a filamentation and photoacoustic compression machining, yet is lower than the threshold critical energy level required to initiate ablative machining; and 9. stopping the burst of laser pulses and filamentation when the desired machining has been completed.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

| Laser Properties | |
|---|---|
| Wavelength | 5 microns or less |
| Pulse width | 10 nanoseconds or less |
| Freq (laser pulse repetition rate) | 1 Hz to 2 MHz |
| Average power | 200-1 watt |
| Number of sub pulses per burst | 1 to 50 |
| Sub pulse spacing | 1 nanosecond to 1 microsecond |
| Pulse energy | 5 µJ to 500 (µJ) micro Joules (Average power/repetition rate) watts/1/sec |
| Orifice Properties | |
| Min Orifice Diameter | .5 microns |
| Max Orifice Diameter | 50 micron |
| Max Orifice Depth | 10 mm in borosilicate glass |
| Typical Aspect Ratio | 1500:1 |
| Max Aspect Ratio | 3000:1 |
| Orifice Sidewall Smoothness (Material Independent) | <5 micron average roughness (e.g., Si, SiC, SiN, GaAs, GaN, InGaP) |
| Orifice Side Wall Taper (Material Independent) | Negligible across 10,000 micron depth |
| Beam Properties | |
| $M^2$ | 1.00-5.00 |

As noted earlier the parameters above vary with the target. In the way of an operational exemplary, to drill a 3 micron hole 2 mm deep in a transparent substrate the following apparatus and parameters would be used: a 1064 nanometer wavelength laser; 65 watts of average power; 80 µJ pulse energy; 8 sub pulses (50 MHz) per burst; and a 100 kHz repetition rate. This would be focused with an aberrated lens delivering distributed foci over 2 mm of space (filament active zone is 2 mm long) focusing 5 to 500 microns to above the top surface depending upon the material.

The Spiral Tube Cutting Methodology

Figure 13:
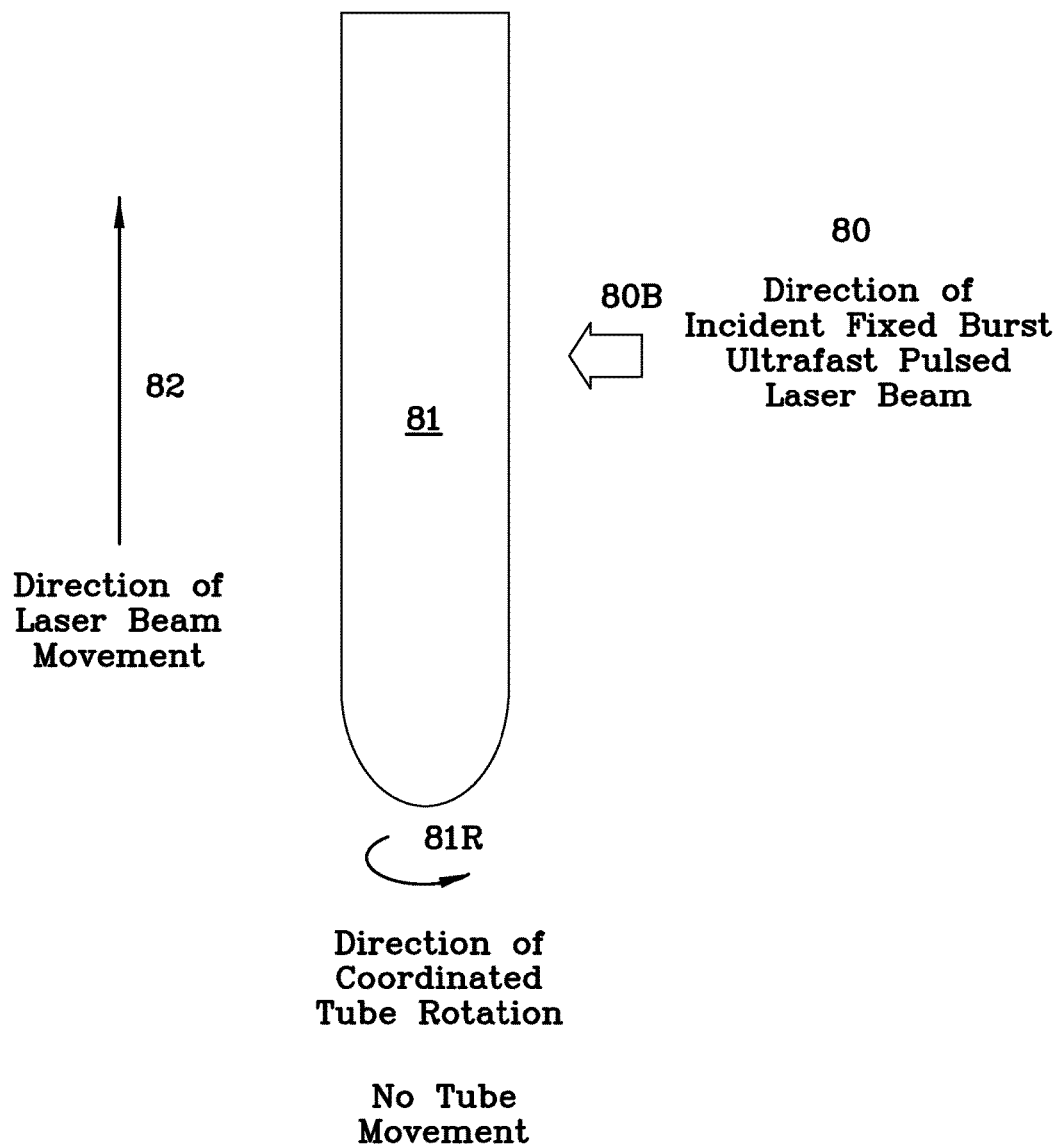
FIG. 13 is representative illustration of a first method of spiral cutting of a borosilicate tube, the first method includes fixing the laser beam's focus and fluence, rotating the transparent tube and linearly moving the incident burst ultrafast pulsed laser beam along the length of the rotating tube.
Figure 14:
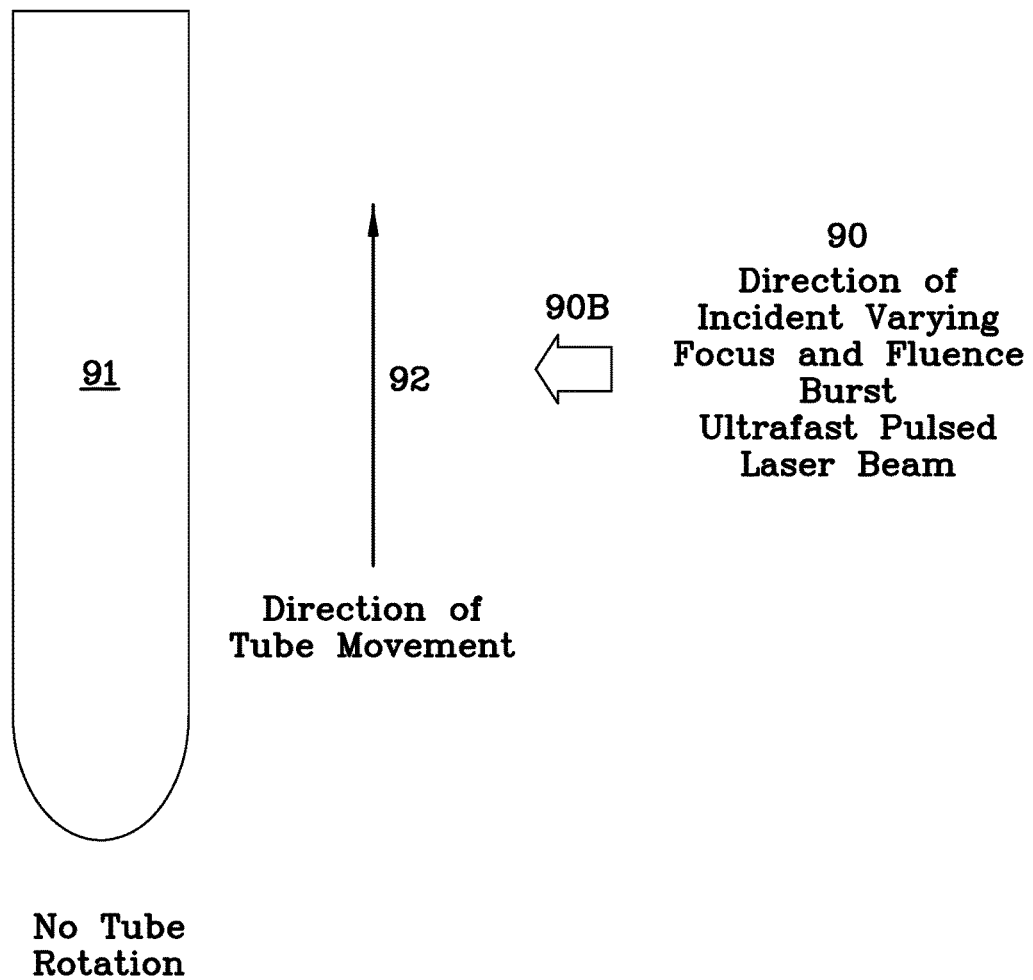
FIG. 14 is representative illustration of a second method of spiral cutting of a borosilicate tube, the second method includes auto adjusting the incident burst ultrafast pulsed laser beam to cut the front, sides and back of the transparent tube by linearly moving the transparent tube with respect to the incident burst ultrafast pulsed laser beam.

The cutting of a curved surface on a transparent medium (such as a glass tube) may be accomplished by the creation of a filament in the desired location in the medium and any one or combination of the following:

Fixing the laser beam's focus and fluence 80, rotating 81R the transparent tube 81 and linearly moving 82 the incident burst ultrafast pulsed laser beam 80B along the length of the rotating tube 81, see FIG. 13;

Auto adjusting 90 the incident burst ultrafast pulsed laser beam 90B to cut the front, sides and back of the transparent tube 91 by linearly moving 92 the transparent tube with respect to the incident burst ultrafast pulsed laser beam, see FIG. 14.

Figure 15:
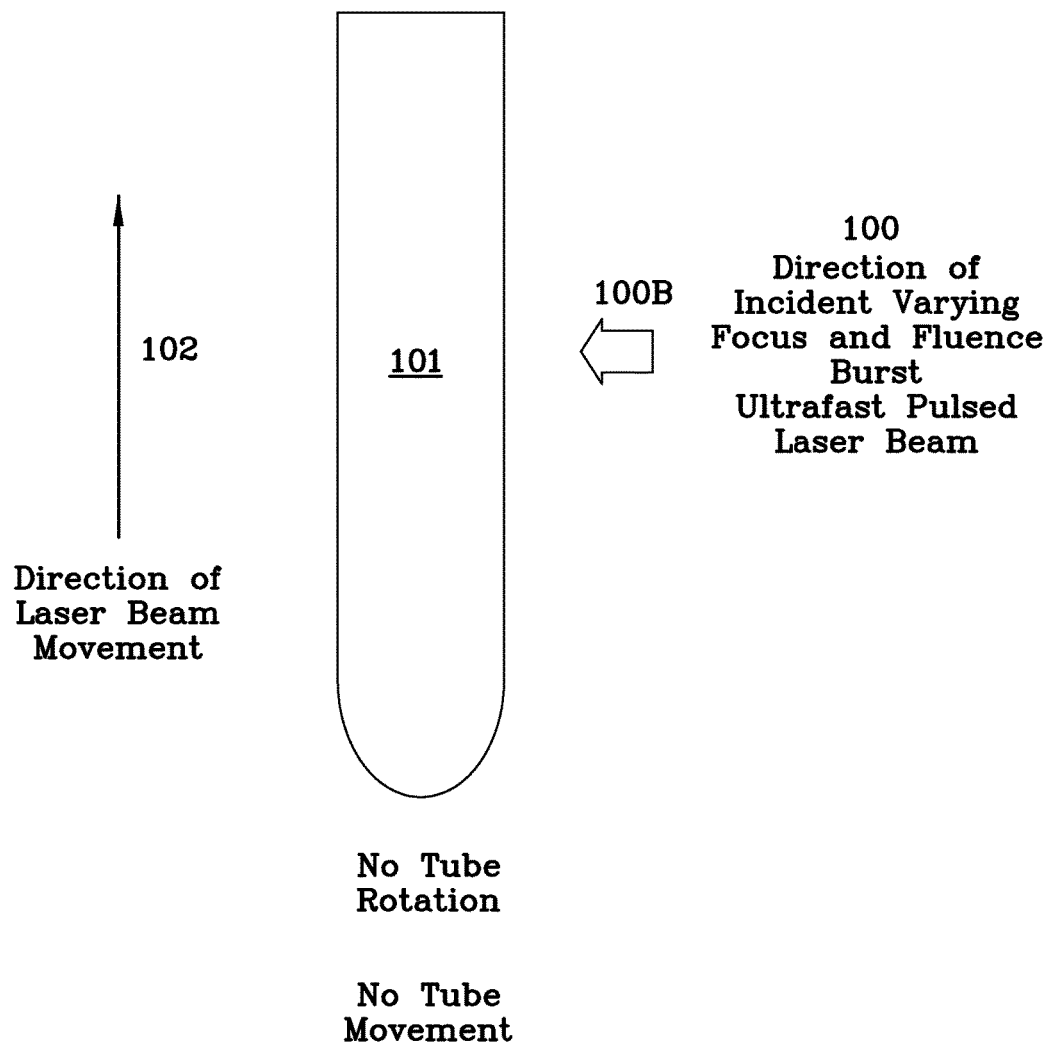
FIG. 15 is representative illustration of a third method of spiral cutting of a borosilicate tube, the third method includes auto adjusting the incident burst ultrafast pulsed laser beam to cut the front, sides and back of the transparent tube while linearly moving the incident burst ultrafast pulsed laser beam along the length of the stationary transparent tube.
Figure 16:
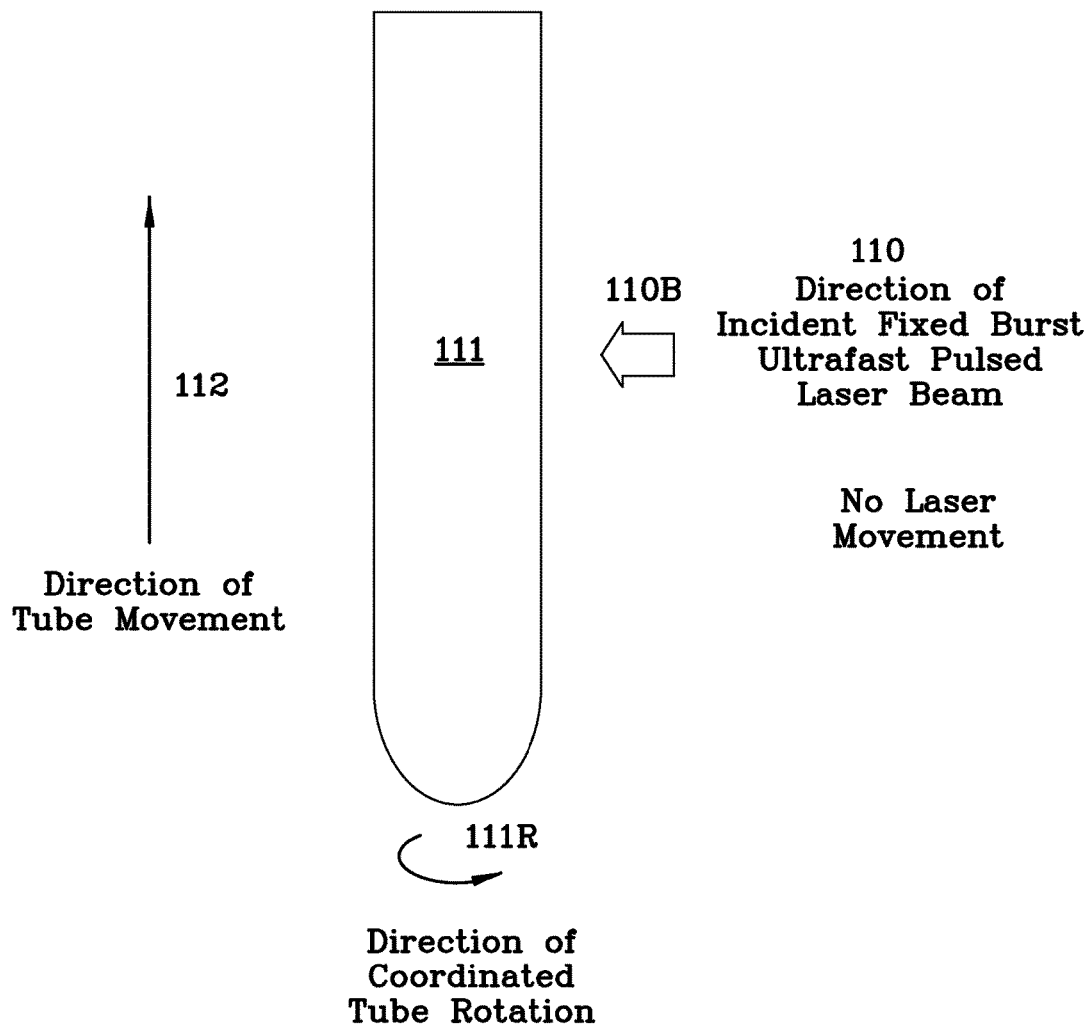
FIG. 16 is representative illustration of a fourth method of spiral cutting of a borosilicate tube, the fourth method includes fixing the laser beam's focus and fluence, rotating the transparent tube and linearly moving the rotating transparent tube along the incident fixed, burst ultrafast pulsed laser beam.

Auto adjusting 100 the incident burst ultrafast pulsed laser beam 100B to cut the front, sides and back of the transparent tube 101 while linearly moving 102 the incident burst ultrafast pulsed laser beam along the length of the stationary transparent tube, see FIG. 15;

Fixing the laser beam's focus and fluence 110, rotating 111R the transparent tube 111 and linearly moving 112 the rotating transparent tube along the incident fixed, burst ultrafast pulsed laser beam, see FIG. 16;

As can be seen, because of the unique properties of photoacoustic compression, auto adjusting the focus and the fluence of the laser beam to correspond to the creation of a filament about the varying distance, thickness, and perimeter of the transparent tube, will allow the entire spiral of the transparent tube to be cut without any rotation of the transparent tube FIGS. 14 and 15. FIG. 15 illustrates the laser beam 100B being moved 102 along the length of the transparent tube 101. FIG. 14 illustrates the transparent tube 91 is moved 92 along the length of the incident laser beam 90B.

In fact, the face of the transparent tube nearest the laser source need not be cut before the back face is cut. In this manner, the cut need not even be made perpendicular to the longitudinal axis of the transparent tube.

Conversely, if the focus and the fluence of the laser beam are fixed a specific distance from the laser beam source, the transparent tube need only be rotated while either the transparent tube is moved perpendicular to the direction of the incident laser beam (FIG. 16) or the incident laser beam is moved along the longitudinal axis of the transparent tube (FIG. 13).

The single pass method of producing a spiral cut transparent tube using laser machining, proceeds with the following steps:

providing a glass tube, the glass tube may be a solid glass tube, or it may comprise wall thicknesses of many different thicknesses;

providing an ultrafast laser beam comprising a burst of laser pulses;

providing a laser beam delivery system capable of focusing the laser beam onto the glass tube and to enable relative movement between the laser beam and the glass tube by moving the laser beam, the glass tube or both, focusing the laser beam relative to the glass tube to form a beam waist at a location that is external to the surface of the glass tube designated for cutting, wherein the laser pulses incident on the surface of the glass tube designated for cutting are focused such that a sufficient energy density is maintained within the glass tube to form a continuous laser filament therethrough without causing optical breakdown;

creating a laser filament that cuts completely through one side of the glass tube by photoacoustic compression;

enabling relative movement between the focused laser beam and the glass tube so as to move the position in the glass tube having the laser filament created therein with the laser beam delivery system so as to make a spiral cut in the glass tube.

It is to be noted that at all times the laser needs be focused correctly so as to avoid the formation of a plasma channel, for of this occurs there will be a sizeable ejecta mound created at the outer and inner faces of the tube.

As discussed herein, the spiral cut need not be cut at 90 degrees to the surface of the glass tube as it may be cut angularly by manipulation of the relationship between the laser beam and the glass tube.

Example 1

Tube rotates and cuts are done partially. There is a demanding market for food packaging which is easy to pull open. In this method a plastic container is laser scribed (marked) in the section to be pulled open while it is strong enough that the package doesn't tear open easily and air can't contaminate the food inside yet it is easy to pull open by hand. Similar approaches can be applied for ampules. Plastics are often used as the container of choice of pharmaceutical companies. However, some medicine needs to be packed in glass ampules to avoid any interaction with plastics.

In the field of healthcare, it is common for a nurse or other medical provider to sustain finger cuts while opening ampules and also always there is a chance for glass particles to contaminate the medicines that ultimately end up in the body of the patient. Pre-scribing ampules with traditional diamond roller is done but major issue is the cracks that form in time and facets are really full of glass particles while cleaving (breaking the ampule open).

Figures 17, 17A:
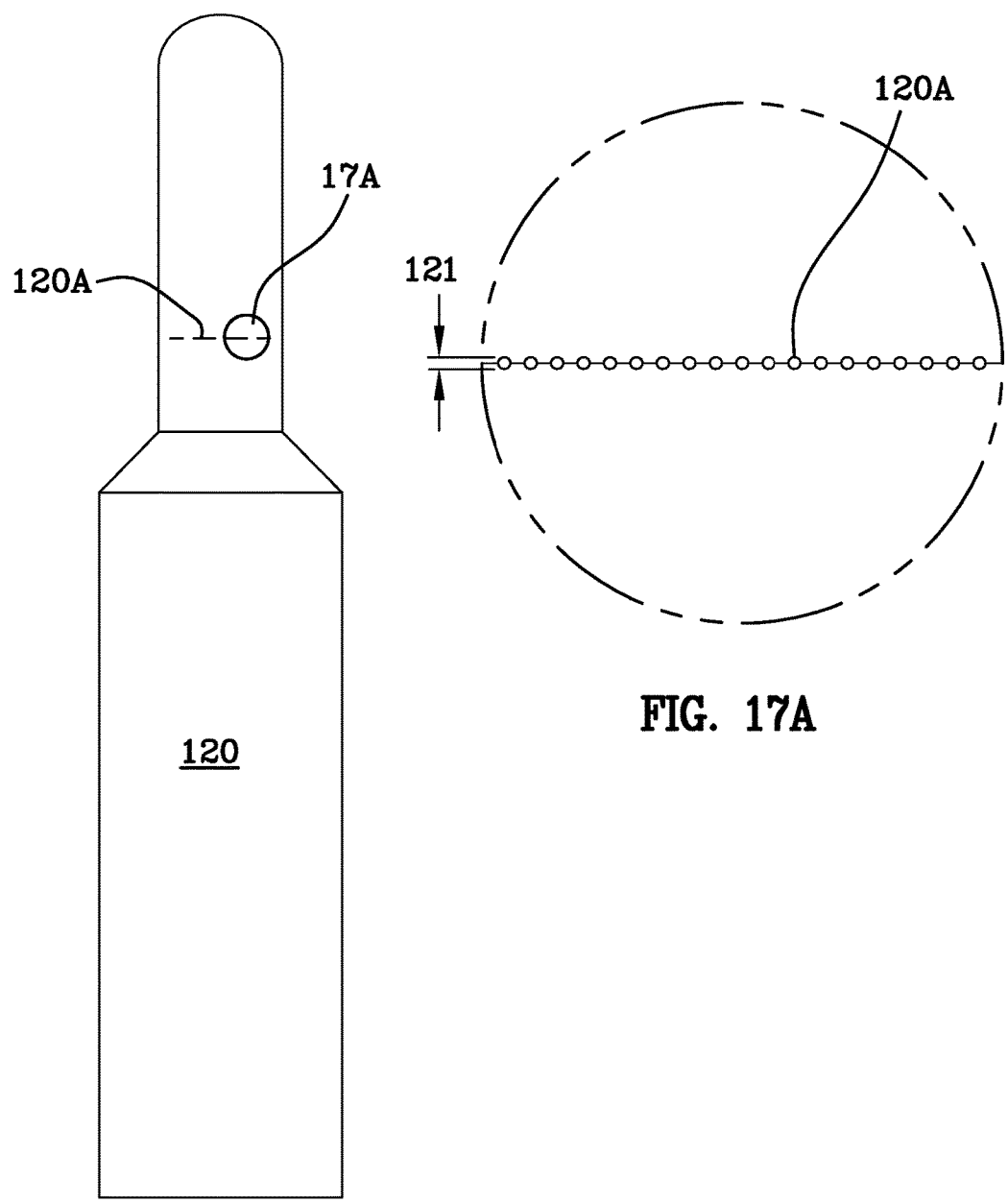
FIG. 17 is a representative illustration of a pre-scribed ampule.
FIG. 17A is an enlargement of a portion of FIG. 17 illustrating the orifices that form the line upon which cleavage will take place; and, FIG. 18 is a representative illustration of a helical tube being cut by head rotation.

As shown in FIG. 17 using filament cutting as the method to pre-cut ampules 120 partially is performed. A line of orifices 120A is illustrated in FIGS. 17 and 17A. In this way no material can come out or in and the kerf width 121 is so small that no debris form when the ampule is opened. The ampule 120 is very easy to cleave along line 120A and the ampules survive for years without crack propagation. Unnumbered cracks are formed between the line of orifices 120A are viewed in FIG. 17A. FIG. 17A is an enlargement of a portion of FIG. 17 illustrating the orifices 120A that form the line upon which cleavage will take place.

Example 2

Figure 18:
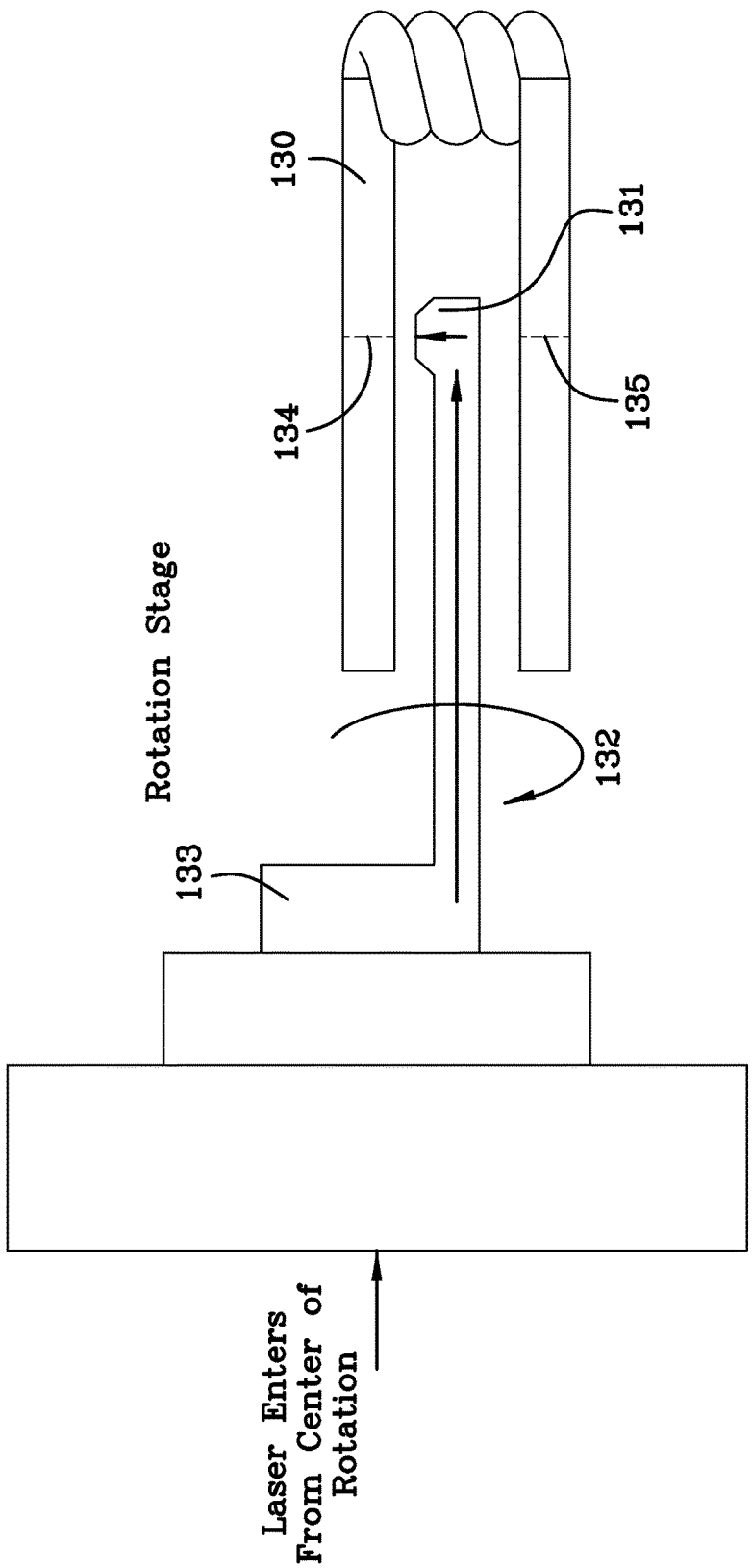

Helical tube cutting is shown in FIG. 18. As shown in FIG. 18, the geometry of the helical tube 130 is such that the tube can't rotate around the center of rotation (tube central axis) while laser cutter head is stationary. Indeed, the laser head 131 must rotate 132 and the helical tube 130 is stationary. The laser beam is delivered from the back of the rotation stage 133 all the way to target (tube) and while tube is stationary, the laser head 131 rotates and scribes 134, 145 the helical tube in two locations.

Figure 19:
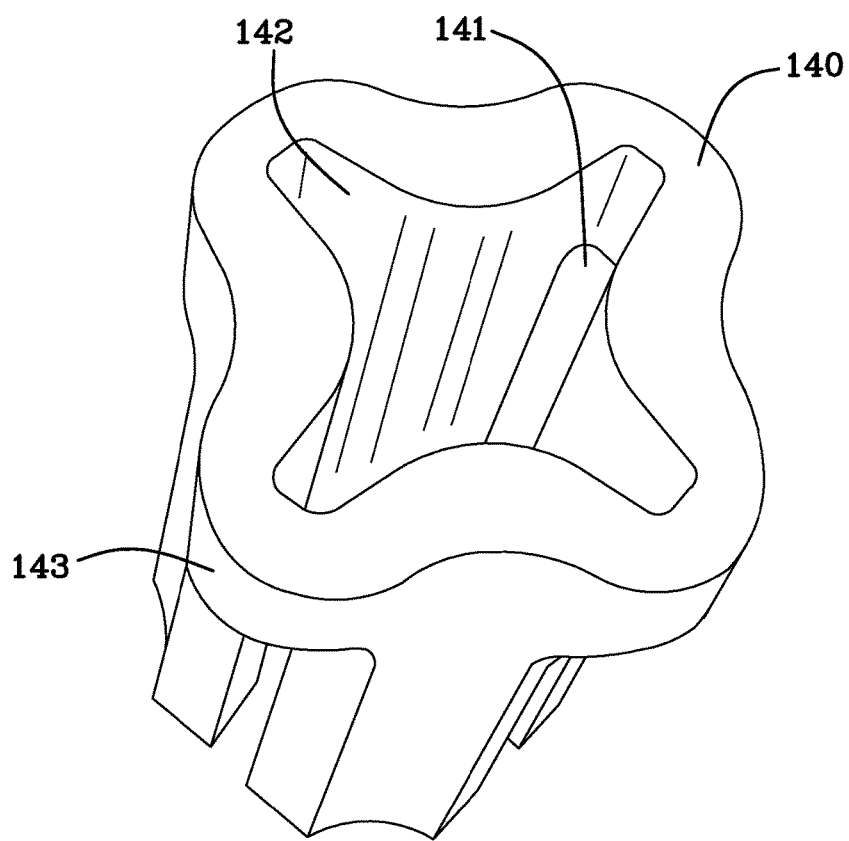
FIG. 19 is a top perspective view of a complex transparent tube machined in zones.
Figure 19A:
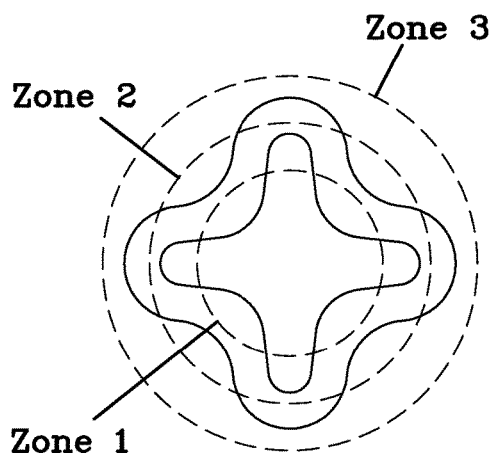
FIG. 19A is diagrammatic view of the complex transparent tube of FIG. 19.
Figure 19B:
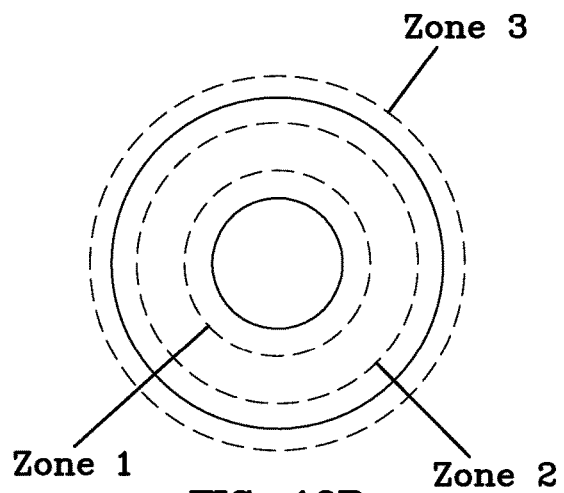
FIG. 19B is a diagrammatic view of another transparent tube to be machined in zones.

FIG. 19 is a top perspective view of a complex transparent tube machined in zones. FIG. 19A is diagrammatic view of the complex transparent tube of FIG. 19. FIG. 19B is a diagrammatic view of another transparent tube to be machined in zones. FIG. 19 presents a complex tube which has been cut. It has negative and positive surfaces. FIG. 19A presents the cross section of the tube, due to special shape and thickness, the machining process is done in multiple scans. Generally scans are done from the inner to the outer surface. In general, scribing of thicker tubes can be done in multiple scans as shown from zone 1 to zone 2 and then zone 3.

FIGS. 19A and 19B are for very thick samples wherein the laser filament is not long enough. In this case cuts are performed in multiple scans. First the bottom zone "zone 1" is scribed, then z changes to zone 2 and then scribing takes place, and, if sample is very thick, then the next zone is scribed.

FIG. 20 is a diagrammatic view of incoming lasers drilling orifices in transparent tubes. FIG. 20 presents the pulse to pulse spacing. Spacing should be 2-10 μm but 5 μm is the optimum. In scribing curved surfaces it should be noted that the other side spot to spot always stays between the 2-10 μm. For example, the spacing is set at 5 μm in the top surface of positive tube and the bottom spacing calculation shows 3 μm which is fine, if it drops below 2 μm then the reservoir will be impacted via diffraction and will prevent filament formation that results in damaged surface.

FIG. 20 presents the laser pulse incident and exit from top and bottom surface of a positive curved surface and a negative curved surface. The pulse to pulse separation never overlaps, there is a minimum of 2 μm separation and it should not exceed 10 μm. More than 10 μm separation doesn't enable easy cleaving but 5 μm is the optimum separation. Depending on the curvature the exit pulse to pulse separation should be within 2 to 10 μm. As an example for a tube having an outside diameter (OD) of 8 mm and an inside diameter (ID) of 6 mm (1 mm thickness) if the entrance surface pulse to pulse is selected to be 5 μm then the exit separation is going to be number of pulses to make one external round=$8\pi/5$ μm=$6\pi/x$ then x=$6/8*5$ μm=$3.75$ μm which is within the limit.

Now if the ID becomes 2 mm (3 mm thick tube) then with 5 μm the outer separation x would be $2/8*5$ μm=$1.25$ μm. In this case the filament will stop before reaching to the bottom edge, one potential solution would be to do the cut in two zones with variable angular frequency to meet the 2 μm limit, or go for a higher step of $2=2/8*x$, then x=$8$ μm.

It is to be understood that the invention is not limited in its application to the arrangements of the components set forth in the following description or illustrated in the drawings. The invention is capable of other embodiments and of being practiced and carried out with various different ordered steps. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A method of producing a spiral cut transparent tube using laser machining, comprising the steps of:
providing a transparent tube, said tube has a surface, said tube selected from the group consisting of a hollow tube or a solid tube;
providing a laser beam comprising a burst of laser pulses, said burst of laser pulses has between 2 to 50 pulses, and each pulse having a width of 10 nanoseconds or less;
providing a laser beam delivery system distributively focusing said laser beam on said transparent tube and to enable relative movement between said laser beam and said transparent tube by moving said laser beam, said transparent tube or both said laser beam and said transparent tube;
focusing said laser beam relative to said transparent tube to form a beam waist at a location external to said surface of said transparent tube wherein said laser pulses incident on said surface of said transparent tube are focused such that sufficient energy density is maintained within said transparent tube to form a continuous laser filament therethrough;
said continuous laser filament cuts into said transparent tube by photoacoustic compression; and,
moving said focused laser beam with respect to said transparent tube so as to make a spiral cut in said transparent tube.

2. The method of producing a spiral cut transparent tube using laser machining as claimed in claim 1 wherein said transparent tube is glass.

3. The method of producing a spiral cut transparent tube using laser machining as claimed in claim 1 wherein said transparent tube is borosilicate glass.

4. The method of producing a spiral cut transparent tube using laser machining as claimed in claim 1 wherein said transparent tube is chemically or heat strengthened glass.

5. The method of producing a spiral cut transparent tube using laser machining as claimed in claim 1 wherein said transparent tube is selected from the group consisting of sapphire, $LiNbO_3$, Silicon, Ti:Sapphire, $LiTaO_3$, transparent ceramics, crystalline rods and GaN.

6. A method of producing a spiral cut transparent tube using laser machining, comprising the steps of:
providing a transparent tube, said transparent tube selected from the group consisting of a hollow tube and a solid tube;
providing a laser beam delivery system distributively focusing a laser beam having a burst of between 2 to 50 laser pulses, each pulse having a width of 10 nanoseconds or less, on said transparent tube to perform photoacoustic compression therein, and to enable relative movement between said laser beam and said transparent tube by moving said laser beam, said transparent tube or both said laser beam and said transparent tube to make a spiral cut in said transparent tube.

7. The method of producing a spiral cut transparent tube using laser machining as claimed in claim 6 wherein said transparent tube is selected from the group consisting of glass, borosilicate glass, chemically or heat strengthened glass, sapphire, $LiNbO_3$, Silicon, Ti:Sapphire, $LiTaO_3$, transparent ceramics, crystalline rods and GaN.

8. A method of producing a partial cut in a transparent material using laser machining, comprising the steps of:
providing a transparent material;
providing a laser beam delivery system distributively focusing a laser beam having a burst of between 2 to 50 laser pulses, each pulse having a width of 10 nanoseconds or less, on said transparent material to perform photoacoustic compression therein, and to enable relative movement between said laser beam and said transparent material by moving said laser beam, said transparent material or both said laser beam and said transparent material to make a partial cut in said transparent material.

9. The method of producing a partial cut in a transparent material using laser machining as claimed in claim 8 wherein said transparent material is selected from the group consisting of glass, borosilicate glass, chemically or heat strengthened glass, sapphire, LiNbO₃, Silicon, Ti:Sapphire, LiTaO₃, transparent ceramics, crystalline rods and GaN.

10. The method of producing a partial cut in a transparent material using laser machining as claimed in claim 9 wherein said transparent material includes packaging of goods and/or medicines which remain sealed.

11. A method of producing a geometric form from a transparent material using laser machining, comprising the steps of:
   providing a transparent material, said transparent material selected from the group consisting of a hollow tube, a solid tube, a solid block;
   providing a laser beam delivery system distributively focusing a laser beam having a burst of between 2 to 50 laser pulses, each pulse having a width of 10 nanoseconds or less, on said transparent material to perform photoacoustic compression therein, and to enable relative movement between said laser beam and said transparent material by moving said laser beam, said transparent material or both said laser beam and said transparent material to make said geometric form in said transparent material.

12. The method of producing a geometric form from a transparent material using laser machining as claimed in claim 11 wherein said transparent material is selected from the group consisting of glass, borosilicate glass, chemically or heat strengthened glass, sapphire, LiNbO₃, Silicon, Ti:Sapphire, LiTaO₃, transparent ceramics, crystalline rods and GaN.

13. The method of producing a geometric form from a transparent material using laser machining as claimed in claim 11 wherein the geometric form is a disk.

14. The method of producing a geometric form from a transparent material using laser machining as claimed in claim 11 wherein the geometric form is a ring.

15. A method of cutting a transparent tube using laser machining, comprising the steps of:
   providing a transparent tube, said tube has a surface, said tube selected from the group consisting of a hollow tube or a solid tube;
   providing a laser beam comprising a burst of laser pulses, said burst of laser pulses has between 2 to 50 pulses, and each pulse having a width of 10 nanoseconds or less;
   providing a laser beam delivery system distributively focusing said laser beam on said transparent tube and to enable relative movement between said laser beam and said transparent tube by moving said laser beam, said transparent tube or both said laser beam and said transparent tube;
   focusing said laser beam relative to said transparent tube to form a beam waist at a location external to said surface of said transparent tube wherein said laser pulses incident on said surface of said transparent tube are focused such that sufficient energy density is maintained within said transparent tube to form a continuous laser filament therethrough;
   said continuous laser filament cuts into said transparent tube by photoacoustic compression; and,
   moving said focused laser beam and said transparent tube so as to make a cut in said transparent tube.

16. The method of cutting a transparent tube using laser machining, as claimed in claim 15, wherein said movement of said laser beam is rotational and/or translational, said movement of said tube is rotational and/or translational.

17. The method of producing a geometric form from a transparent material using laser machining as claimed in claim 15 wherein said transparent material is selected from the group consisting of glass, borosilicate glass, chemically or heat strengthened glass, sapphire, LiNbO₃, Silicon, Ti:Sapphire, LiTaO₃, transparent ceramics, crystalline rods and GaN.

* * * * *